(12) United States Patent
Hanawa et al.

(10) Patent No.: US 6,360,158 B1
(45) Date of Patent: Mar. 19, 2002

(54) INTELLIGENT CRUISE CONTROL DEVICE

(75) Inventors: Kazuhiko Hanawa; Mitsuru Nakamura; Kazuo Matsuura, all of Hitachinaka; Satoru Kuragaki, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/923,414

(22) Filed: Sep. 4, 1997

(30) Foreign Application Priority Data

Sep. 4, 1996 (JP) .............................................. 8-233874

(51) Int. Cl.$^7$ .............................................. B60K 31/04
(52) U.S. Cl. ........................... 701/93; 701/96; 342/455; 340/903; 180/179
(58) Field of Search .............................. 701/93, 96, 97, 701/98, 300, 301; 180/167–169, 176–179; 123/350, 352; 342/454, 455, 109; 340/901–904

(56) References Cited

U.S. PATENT DOCUMENTS

| | | | | |
|---|---|---|---|---|
| 4,622,636 A | * | 11/1986 | Tachibana | 340/904 |
| 5,215,159 A | * | 6/1993 | Nishida | 180/179 |
| 5,400,864 A | * | 3/1995 | Winner et al. | 701/96 |
| 5,493,302 A | * | 2/1996 | Woll et al. | 342/109 |
| 5,529,139 A | * | 6/1996 | Kurahashi et al. | 180/169 |
| 5,594,645 A | * | 1/1997 | Nishimura et al. | 701/96 |
| 5,689,422 A | * | 11/1997 | Heymann et al. | 701/96 |

FOREIGN PATENT DOCUMENTS

JP     08-132918     5/1996

* cited by examiner

Primary Examiner—Gary Chin
(74) Attorney, Agent, or Firm—Crowell & Moring LLP

(57) ABSTRACT

The present invention provides an intelligent cruise control device installed in a host vehicle and used for performing follow-up cruise control to follow up a moving target located in front of the host vehicle by supplying an operating signal to an auto cruise control device which is used for carrying out auto cruise control to adjust the speed of the host vehicle by carrying out an operation indicated by the operating signal generated by the operating part in accordance with an operation type such as acceleration and deceleration specified by the driver so that the host vehicle is running at the adjusted speed. The intelligent cruise control device further comprises: a storage means for storing information on the operating signal for each operation type such as acceleration and deceleration; an operation determining means for determining the type of an operation required by the host vehicle to follow up a moving target located in front of the host vehicle from information on the speed of the host vehicle and information on the range between the host vehicle and the moving target; and a signal generating means for reading out information on an operating signal for the type of an operation determined by the operation determining means from the storage means and for generating the operating signal in accordance with the information on the operating signal read out from the storage means.

5 Claims, 24 Drawing Sheets

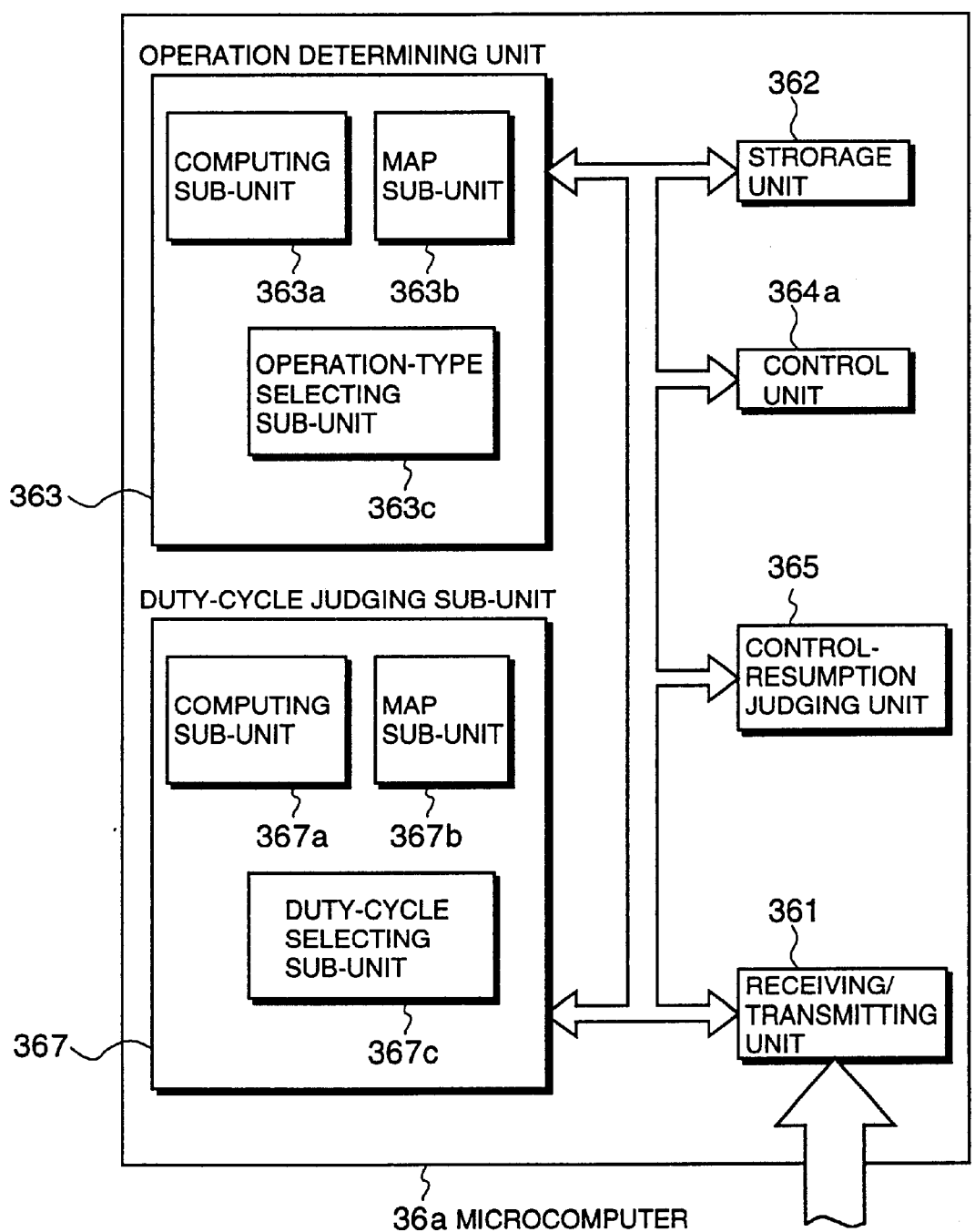

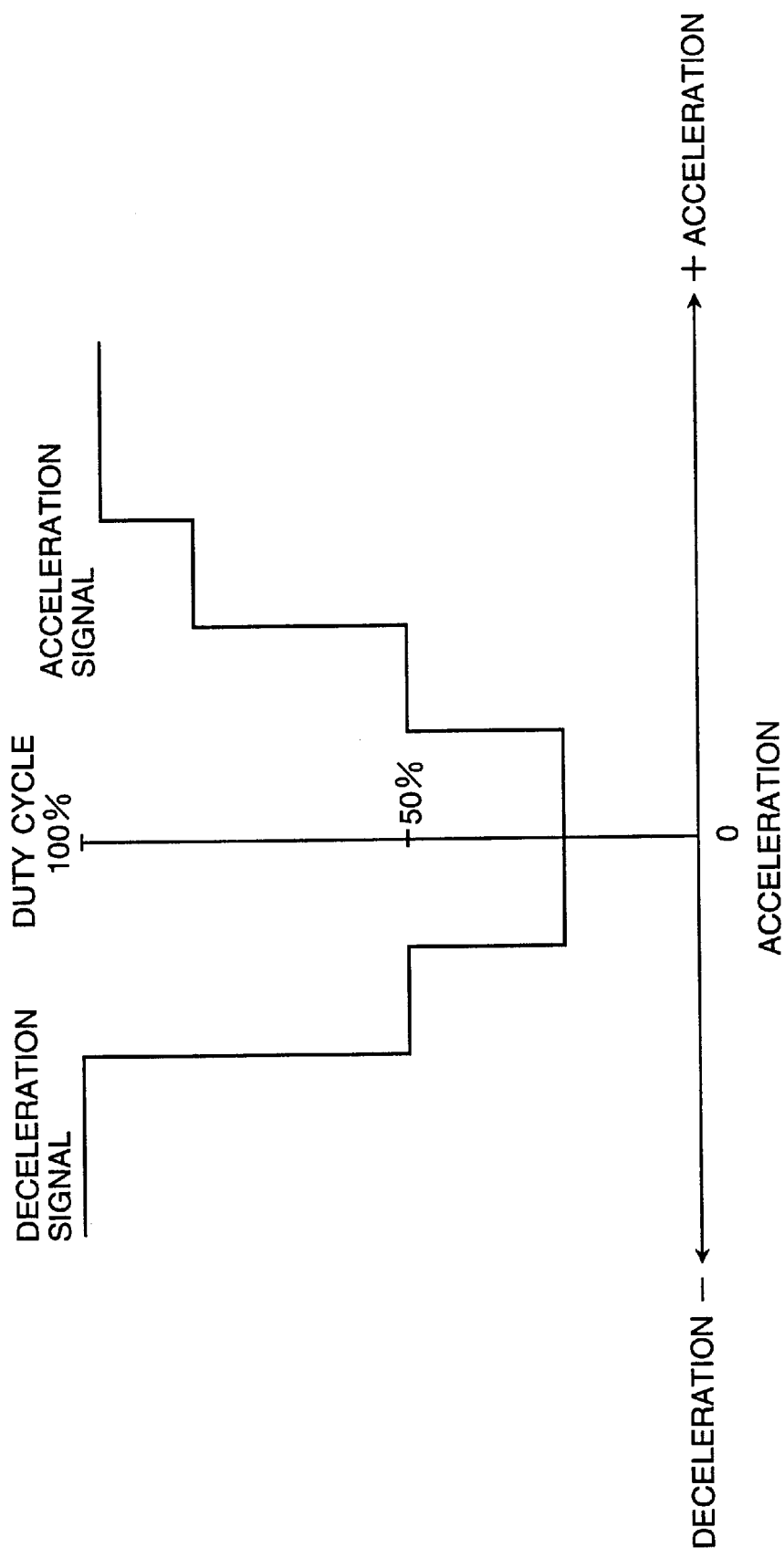

DECELERATION (1)

DECELERATION (2)

DECELERATION (3)

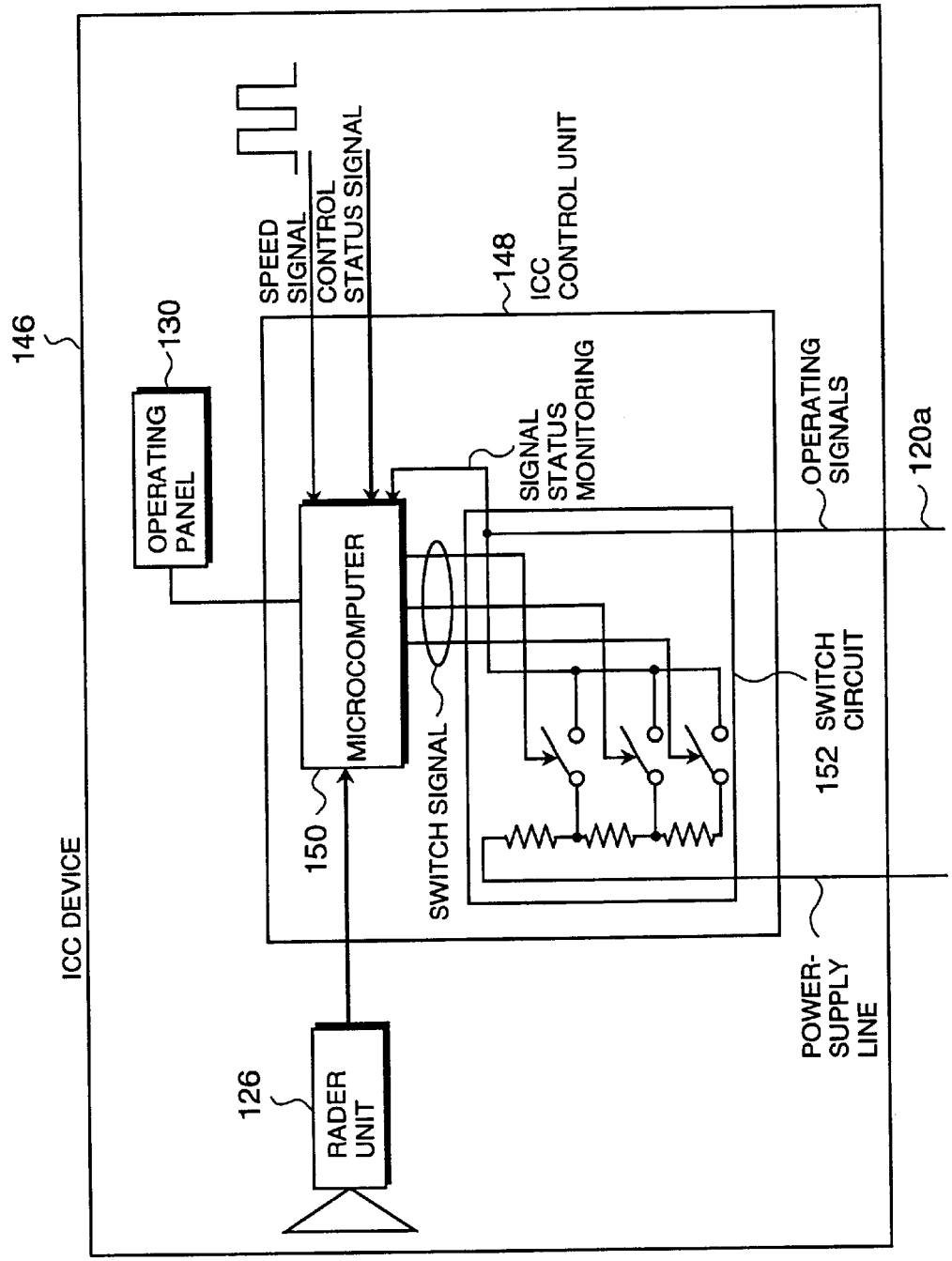

INTELLIGENT CRUISE CONTROL DEVICE

BACKGROUND OF THE INVENTION

In general, the present invention relates to an intelligent cruise control device for adjusting the cruise speed of the host vehicle by automatically accelerating and decelerating the host vehicle so as to enable the host vehicle to maintain the distance between the host vehicle and a front vehicle at a safe range. In particular, the present invention relates to an intelligent cruise control device for adjusting the cruise speed of the host vehicle by controlling an operating signal supplied to an existing auto cruise control device already installed in the host vehicle.

In recent years, a so-called intelligent cruise control device, that is, an automatic follow-up cruise device for adjusting the cruise speed of the host vehicle by automatically accelerating and decelerating the host vehicle so as to enable the host vehicle to maintain the distance between the host vehicle and a front vehicle at a safe range, is becoming popular. The intelligent cruise control device is also referred to hereafter simply as an ICC device. In Japanese Patent Laid-open No. Hei 5-221253, the configuration of a representative ICC device is disclosed. The disclosed ICC device comprises, among other components, a sensor for measuring the range between the host and front vehicles, a processing unit, a throttle valve and a brake actuator. The processing unit computes a safe range between the host and front vehicles from the speed of the host vehicle and a range measured by the sensor. Automatic follow-up cruise control is then carried out by adjusting the speed of the host vehicle by operations of the throttle valve and the brake so as to maintain the distance between the host and front vehicles at the computed safe range.

By the way, there is a so-called retrofit type of the ICC device for adjusting the cruise speed of the host vehicle through control of an operating signal supplied to a so-called auto cruise control device, an existing auto cruise device which has been already installed in the host vehicle. The auto cruise control device is also referred to hereafter simply as an ASCD device. The ASCD device is a device for carrying out auto cruise control by adjusting the speed of the host vehicle in accordance with an operating signal supplied by the driver so that the host vehicle is running at the adjusted speed. Normally, there are three types of operating signals. The first operating signal is an acceleration signal for accelerating the host vehicle by opening the throttle valve. On the other hand, the second operating signal is a deceleration signal for decelerating the host vehicle by closing the throttle valve. Finally, the third operating signal is a cancel signal to cancel the speed control using the ASCD device. With the retrofit-type ICC device, it is possible to effectively utilize functions of the existing ASCD device already owned by the driver in the host vehicle, offering a merit that the cost of the ICC device can be reduced.

FIG. 23 is a schematic diagram showing the configuration of a cruise control apparatus comprising a representative ASCD device and an ICC device used in conjunction with the ASCD device whereas FIG. 24 is a schematic diagram showing the configuration of the ICC device shown in FIG. 23.

In the ASCD device 110 shown in FIG. 23, when a resume-acceleration switch 112a employed in an ASCD switch circuit 112 is turned on, a voltage signal generated by a power supply 118 is output to a signal line 120a. When a set-coast switch 112b is turned on, on the other hand, the voltage signal generated by the power supply 118 is output to the signal line 120b. In addition, when a cancel switch 112c is turned on, the voltage signal generated by the power supply 118 is output to both the signal lines 120a and 120b. When the voltage signal is supplied only to the signal line 120a, the voltage signal is supplied to an ASCD control unit 114 as an acceleration signal. Receiving the acceleration signal, the ASCD control unit 114 outputs a control signal to a throttle valve operating unit 116, requesting the throttle valve operating unit 116 to open the throttle valve to a predetermined degree of opening. At a point in time when the electrical voltage signal disappears from the signal line 120a, that is, at a point in time when the resume-accleration switch 112a is turned off, a value of the vehicle speed is read in from a speed sensor 122 and a control signal is then output to the throttle valve operating unit 116 to drive the host vehicle into a constant-speed cruise at the speed read in from the speed sensor 122. When the voltage signal is supplied only to the signal line 120b, on the other hand, the voltage signal is supplied to the ASCD control unit 114 as a deceleration signal. Receiving the deceleration signal, the ASCD control unit 114 outputs a control signal to the throttle valve operating unit 116, requesting the throttle valve operating unit 116 to close the throttle valve. At a point in time when the electrical voltage signal disappears from the signal line 120b, that is, at a point in time when the set-coast switch 112b is turned off, a value of the vehicle speed is read in from a speed sensor 122 and a control signal is then output to the throttle valve operating unit 116 to drive the host vehicle into a constant-speed cruise at the speed read in from the speed sensor 112. Finally, when the voltage signal from the power supply 118 is output to both the signal lines 120a and 120b, the voltage signal is regarded as a cancel signal and the throttle valve control by the ASCD device 110 is thereby discontinued.

In the ICC device 124 shown in FIG. 24, a microcomputer 132 employed in an ICC control unit 128 computes a safe range between the host vehicle and a front vehicle from the speed detected by the speed sensor 122, the present range between the host and front vehicle detected by a radar unit 126 and a set value of the speed supplied by the driver to an operating panel 130. Then, an operating signal is supplied to the ASCD device 110 through a switch circuit 134 so that the distance between the host and front vehicles is brought to the safe range computed by the microcomputer 132. To be more specific, in order to accelerate the host vehicle, the microcomputer 132 turns on a switch 134a employed in the switch circuit 134, forwarding a voltage signal generated by the power supply 118 to the signal line 120a as an acceleration signal. In order to decelerate the host vehicle, on the other hand, the microcomputer 132 turns on a switch 134b employed in the switch circuit 134, forwarding the voltage signal generated by the power supply 118 to the signal line 120b as a deceleration signal. In order to discontinue speed control by the ICC device 124 as requested by a command entered by the driver via the operating panel 130, the microcomputer 132 turns on both the switches 134a and 134b of the switch circuit 134, forwarding the voltage signal generated by the power supply 118 to both the signal lines 120a and 120b. In this way, the ICC device 124 can effectively utilize the functions of the ASCD device 110, allowing the cruise speed to be adjusted so as to bring the range between the host and front vehicles to a predetermined value.

FIG. 25 is a schematic diagram showing the configuration of a cruise control apparatus comprising a representative ASCD device having specifications different from those of the ASCD device shown in FIG. 23 and an ICC device used in conjunction with the ASCD device whereas FIG. 26 is a skeleton diagram showing the configuration of the ICC device shown in FIG. 25.

In the ASCD device 138 shown in FIG. 25, the operation of a resume-acceleration switch 140a, a set-coast switch 140b or a cancel switch 140c employed in an ASCD switch circuit 140 changes the level of a voltage signal output to a signal line 142. An ASCD control unit 144 carries out a predetermined operation in accordance with the level of the voltage signal output to the signal line 142. When the resume-acceleration switch 140a is turned on, the voltage signal appearing on the signal line 142 is supplied to an ASCD control unit 144 as an acceleration signal. Receiving the acceleration signal, the ASCD control unit 144 outputs a control signal to the throttle valve operating unit 116, requesting the throttle valve operating unit 116 to open the throttle valve to a predetermined degree of opening. At a point in time when the electrical voltage signal disappears from the signal line 142, that is, at a point in time when the resume-acceleration switch 140a is turned off, a value of the vehicle speed is read in from the speed sensor 122 and a control signal is then output to the throttle valve operating unit 116 to drive the host vehicle into a constant-speed cruise at the speed read in from the speed sensor 122. When the set-coast switch 140b is turned on, on the other hand, the voltage signal appearing on the signal line 142 is supplied to the ASCD control unit 144 as a deceleration signal. Receiving the deceleration signal, the ASCD control unit 144 outputs a control signal to the throttle valve operating unit 116, requesting the throttle valve operating unit 116 to close the throttle valve. At a point in time when the electrical voltage signal disappears from the signal line 142, that is, at a point in time when the set-coast switch 140b is turned off, a value of the vehicle speed is read in from a speed sensor 122 and a control signal is then output to the throttle valve operating unit 116 to drive the host vehicle into a constant-speed cruise at the speed read in from the speed sensor 112. Finally, when the cancel switch is turned on, the voltage signal appearing on the signal line 142 is supplied to the ASCD control unit 144 as a cancel signal. Receiving the cancel signal, the ASCD control unit 144 halts the throttle valve control by the ASCD device 138.

In the ICC device 146 shown in FIG. 26, a microcomputer 150 employed in an ICC control unit 148 computes a safe range between the host vehicle and a front vehicle from the speed detected by the speed sensor 122, the present range between the host and front vehicle detected by the radar unit 126 and a set value of the speed supplied by the driver to an operating panel 130. Then, an operating signal is supplied to the ASCD device 138 through a switch circuit 152 so that the distance between the host and front vehicles is brought to the safe range computed by the microcomputer 150. To be more specific, in order to accelerate the host vehicle, the microcomputer 150 turns on a switch 152a employed in the switch circuit 152, lowering a voltage signal generated by the power supply 118 to a level corresponding to the acceleration signal before applying the signal level to a signal line 142. In order to decelerate the host vehicle, on the other hand, the microcomputer 132 turns on a switch 152b employed in the switch circuit 152, lowering the voltage signal generated by the power supply 118 to a level corresponding to the deceleration signal before applying the signal level to the signal line 142. In order to discontinue speed control by the ICC device 146 as requested by a command entered by the driver via the operating panel 130, the microcomputer 132 turns on a switch 152c employed in the switch circuit 152, lowering the voltage signal generated by the power supply 118 to a level corresponding to the cancel signal before applying the signal level to the signal line 142. In this way, the ICC device 146 can effectively utilize the functions of the ASCD device 138, allowing the cruise speed to be adjusted so as to bring the range between the host and front vehicles to a predetermined value.

However, the conventional retrofit-type ICC device has the following problems.

First Problem

As described above, in general, the three operating signals of the ASCD device are the acceleration signal for opening the throttle valve to accelerate the host vehicle, the deceleration signal for closing the throttle valve to decelerate the host vehicle and the cancel signal for canceling the speed control by the ASCD device. In actuality, however, the states of implementation of the operating signals may vary from manufacturer to manufacturer. For this reason, there is raised a problem that a retrofit-type ICC device made to conform to the specifications of an ASCD device, strictly speaking, to conform to the states of implementation of the acceleration, deceleration and cancel signals of the ASCD device, can not be used in conjunction with another ASCD device having different specifications. For example, the ICC device 124 shown in FIG. 24 can be used in conjunction with the ASCD device 110 shown in FIG. 23 but can not work with the ASCD device 138 shown in FIG. 25.

Second Problem

In the conventional ASCD device, the auto cruise control is suspended not only by the cancel signal but also by an operation carried out by the driver on the brake pedal. Once the auto cruise control has been suspended, it can not be resumed unless the driver supplies the acceleration or deceleration signal to the ASCD control unit by using the ASCD switch circuit. In addition, also in the case of the conventional retrofit-type ICC device described above, an operation carried out by the driver on the brake pedal also disables the operating signals output to the ASCD device. As a result, there is raised a problem that, on a road where the brake operation is carried out frequently such as a road with heavy traffic, the automatic follow-up cruise control can not be performed.

Third Problem

In most of the conventional ASCD devices, the speed of the host vehicle is detected by monitoring a speed signal output by a speed sensor 42 for generating the speed signal with a frequency proportional to the speed of the host vehicle and auto cruise control is carried out for speeds in the speed range 40 to 100 km/h set in advance. By the way, used for carrying out speed control by utilizing the functions of an existing ASCD device already installed in the host vehicle, the conventional retrofit-type ICC device has a problem that the automatic follow-up cruise control can not be performed in the case of a cruise at a low speed of slower than 40 km/h such as cruise on a road in a commercial district during rush hours. It should be noted that by changing the range of the speed in the ASCD device, automatic follow-up cruise control can be performed for a cruise at a low speed slower than 40 km/h and for other purposes. In this case, however, it is necessary to modify the control software of the ASCD device and, hence, to redesign the ASCD device. The redesigning of the ASCD device makes it quite within the bounds of possibility that the reliability of the device deteriorates. In addition, the ASCD device can not be redesigned by an ordinary driver.

Fourth Problem

In the conventional ASCD device, when the driver supplies an acceleration signal, control is carried out so as to open the throttle valve to a certain fixed degree of opening. This means that, with the conventional ASCD device, it is impossible to perform fine throttle valve on/off control such as an operation carried out by the driver on the accelerator. Used for carrying out speed control by utilizing the functions of an existing ASCD device already installed in the host vehicle as described above, in the case of a front vehicle running at an acceleration lower than a fixed acceleration of the host vehicle resulting from the control to open the throttle valve to a certain fixed degree of opening for example, the ICC device adjusts the cruise speed of the host vehicle so that the host vehicle follows up the front vehicle by running at repetitive accelerated and constant speeds alternate with each other during the cruise. The repetition of the accelerated and constant-speed cruise speeds alternate with each other induces vibration at a low frequency which gives rise to a problem of providing an uncomfortable feeling to the driver.

Fifth Problem

The range between the host and front vehicles needs to be increased in proportion to the speed of the host vehicle. Thus, in the conventional ICC device, a safe range is computed from a range set in advance and the speed of the host vehicle at the present point in time when. A type of the operation, that is, acceleration or deceleration of the host vehicle is then determined so as to bring the distance between the host and front vehicles to the computed safe range by referring to a closing rate of the host vehicle with respect to the front vehicle. The closing rate is found by dividing a variation in range by the length of a time it takes for the range to change by the variation. As an alternative, the type of a necessary operation to assure a safe range between the host and front vehicles for the current speed of the host vehicle is determined by plotting the speed, the range and the closing rate of the host vehicle with respect to the front vehicle at the present point of time on a map showing relations among the speed, the range, the closing rate and the types of an operation: acceleration and deceleration. There is thus raised a problem that, with the conventional ICC device, the type of a necessary operation can not be determined in a short period of time or the type of a necessary operation has to be determined by using a complicated map.

SUMMARY OF THE INVENTION

The present invention addresses the various problems encountered in the conventional retrofit-type ICC device for carrying out automatic follow-up cruise control by utilizing the functions of an existing ASCD device as described above.

It is thus a first object of the present invention to provide an ICC device that can be used in conjunction with an existing ASCD device without regard to the states of implementation of the operating signals, that is, the acceleration, deceleration and cancel signals, of the ASCD device.

It is a second object of the present invention to provide an ICC device capable of carrying out automatic follow-up cruise control even in the case of a cruise on a heavy-traffic road such as a road where the brake operation is carried out frequently.

It is a third object of the present invention to provide an ICC device capable of carrying out automatic follow-up cruise control by using functions of an existing ASCD device even for a speed outside a speed range set in the ASCD device.

It is a fourth object of the present invention to provide an ICC device that is, by using functions of an existing ASCD device, capable of preventing the driver from being provided with an uncomfortable feeling caused by repetition of cruises at accelerated and constant speeds alternate with each other in following up a front vehicle running at an acceleration lower than the acceleration provided by the ASCD device.

It is a fifth object of the present invention to provide an ICC device that is, by using functions of an existing ASCD device, capable of determining the type of an operation such as acceleration or deceleration required in a follow-up cruise in a short period of time.

In order to solve the problems described above, according to a first aspect of the present invention, there is provided an intelligent cruise control device installed in a host vehicle and used for performing follow-up cruise control to follow up a moving target located in front of the host vehicle by supplying an operating signal generated by an operating part employed therein in accordance with an operation type such as acceleration and deceleration specified by a driver to an auto cruise control device. The auto cruise control device is used for carrying out auto cruise control to adjust the speed of the host vehicle by carrying out an operation indicated by the operating signal generated by the operating part so that the host vehicle is running at the adjusted speed. The intelligent cruise control device comprises:

a storage means for storing information on the operating signal generated by the operating part for each operation type such as acceleration and deceleration;

an operation determining means for determining the type of an operation required by the host vehicle to follow up the moving target located in front of the host vehicle from information on the speed of the host vehicle and information on the range between the host vehicle and the moving target;

a signal generating means for reading out information on an operating signal for the type of an operation determined by the operation determining means from the storage means and for generating the operating signal in accordance with the information on the operating signal read out from the storage means;

a message notifying means for requesting the driver to specify each operation type such as acceleration and deceleration in a predetermined order by using the operating part;

a signal detecting means for sequentially detecting operating signals sequentially generated at the operating part for each operation type such as acceleration and deceleration specified by the driver in the predetermined order as requested by the message notifying means; and a storage control means for letting information on each of the operating signals sequentially detected by the signal detecting means be stored in the storage means as information for the operation type specified as is requested by the message notifying means in the predetermined order the operating signals are detected.

According to a second aspect of the present invention, there is provided an intelligent cruise control device installed in a host vehicle and used for performing follow-up cruise control to follow up a moving target located in front of the host vehicle by supplying an operating signal generated by an operating part employed therein in accordance with an operation type such as acceleration and deceleration specified by a driver to an auto cruise control device which is used for carrying out auto cruise control to adjust the speed of the host vehicle by carrying out an operation indicated by the operating signal generated by the operating part so that the host vehicle is running at the adjusted speed, and is used for halting the auto cruise control in case the driver carries out a brake operation until the operating signal is generated again, the intelligent cruise control device comprising:

a brake-operation detecting means for detecting a brake operation;

a control halting means which is used for halting supplying of the operating signal in order to stop the follow-up cruise control when a brake operation is detected by the brake-operation detecting means;

a range judging means which is used for forming a judgment as to whether or not a range between the host vehicle and the moving target located in front of the host vehicle is maintained at a value set in advance in accordance with the speed of the host vehicle after a predetermined period of time has lapsed since detection of the brake operation by the brake-operation detecting means; and a follow-up-cruise-control resuming means which is used for re-starting the supplying of the operating signal in order to resume the follow-up cruise control when an outcome of the judgment formed by the range judging means indicates that the range between the host vehicle and the moving target located in front of the host vehicle is maintained at the value.

According to a third aspect of the present invention, there is provided an intelligent cruise control device installed in a host vehicle for carrying out followup cruise control, the intelligent cruise control device comprising:

an operating part for generating an operating signal in accordance with an operation type such as acceleration and deceleration specified by the driver;

a speed-signal generating means for generating a speed signal with a frequency proportional to the speed of the host vehicle; and a speed detection means for originally for detecting the speed by inputting the speed signal generated by the speed-signal generating means, wherein the follow-up cruise control is performed thereby to follow up a moving target located in front of the host vehicle by supplying the operating signal to an auto cruise control device which is used for carrying out auto cruise control to adjust the speed of the host vehicle within a predetermined speed range by carrying out an operation indicated by the operating signal generated by the operating part so that the host vehicle is running at the adjusted speed supplied to the speed detection means, the intelligent cruise control device further comprising a control means for controlling the auto cruise control device by modulating the frequency of the speed signal generated by the speed-signal generating means and for supplying the frequency-modulated speed signal to the speed detection means in order to shift the frequency of the speed signal generated by the speed-signal generating means to a frequency representing a speed in the predetermined speed range before supplying the frequency-modulated speed signal to the speed inputting means so as to allow the follow-up cruise control to be carried out even for an actual speed outside the predetermined speed range.

According to a fourth aspect of the present invention, there is provided an intelligent cruise control device installed in a host vehicle and used for performing follow-up cruise control to follow up a moving target located in front of the host vehicle by supplying an operating signal generated by an operating part employed therein in accordance with an operation type such as acceleration and deceleration specified by a driver to an auto cruise control device which is used for carrying out auto cruise control to adjust the speed of the host vehicle by carrying out an operation indicated by the operating signal generated by the operating part so that the host vehicle is running at the adjusted speed, the intelligent cruise control device further comprising:

an operation determining means for determining the type of an operation required by the host vehicle to follow up the moving target located in front of the host vehicle from information on the speed of the host vehicle and information on the range between the host vehicle and the moving target;

an acceleration computing means for computing the acceleration of the moving target located in front of the host vehicle from information on the speed of the host vehicle and information on the range between the host vehicle and the moving target; and a signal generating means for generating an operating signal corresponding to the type of an operation determined by the operation determining means, a signal that makes the acceleration of the host vehicle substantially equal to the acceleration of the moving target calculated by the acceleration computing means.

According to a fifth aspect of the present invention, there is provided an intelligent cruise control device installed in a host vehicle and used for performing follow-up cruise control to follow up a moving target located in front of the host vehicle by supplying an operating signal generated by an operating part employed therein in accordance with an operation type such as acceleration and deceleration specified by the driver to an auto cruise control device which is used for carrying out auto cruise control to adjust the speed of the host vehicle by carrying out an operation indicated by the operating signal generated by the operating part so that the host vehicle is running at the adjusted speed, the intelligent cruise control device further comprising:

a time-interval/closing-rate computing means for computing a time interval and a closing rate from information on the speed of the host vehicle and information on the range between the host vehicle and the moving target located in front of the host vehicle, where the time interval is defined as the length of time it takes for the host vehicle to arrive at the present position of the moving target located in front of the host vehicle by assuming that the moving target is stationary, and the closing rate is defined as the speed of the host vehicle relative to the moving target;

an operation determining means for determining the type of a required operation appropriate for the time interval and the closing rate computed by the time-interval/closing-rate computing means by selecting the type of the operation such as acceleration or deceleration from a map showing relations among the time interval of the host vehicle with respect to the moving target located in front of the host vehicle, the closing rate of the host vehicle with respect to the moving target and the types of operation such as acceleration and deceleration; and a signal generating means for generating an operating signal corresponding to the type of an operation determined by the operation determining means.

In the ICC device according to the fifth aspect of the present invention, it is desirable that the map cited above is a map that has a coordinate system with one axis representing the range between the host vehicle and a moving target located in front of the host vehicle, another axis representing the closing rate of the host vehicle with respect to the moving target, the origin thereof located at a point representing a time arrival set in advance and a zero closing rate, and at least the third quadrant thereof allocated as a region with a deceleration operation type.

BRIEF DESCRIPTION OF THE DRAWINGS

Preferred embodiments of the present invention will be described by referring to accompanying drawings wherein:

FIG. 17 is a functional block diagram showing a microcomputer employed in an ICC control unit of an ICC device implemented by a third embodiment of the present invention;

FIG. 19 is a diagram used for explaining a map showing a relation between the acceleration/deceleration and duties of acceleration and deceleration signals generated at a predetermined period;

FIG. 26 is a schematic diagram showing the configuration of the conventional ICC device shown in FIG. 25.

DETAILED DESCRIPTION OF THE PREFERRED EMBODIMENTS

The present invention will become more apparent from a study of the following detailed description with reference to the accompanying diagrams.

The description begins with conceptual explanation of follow-up cruise control carried out by means of an ICC device implemented by an embodiment of the present invention.

Figure 1:
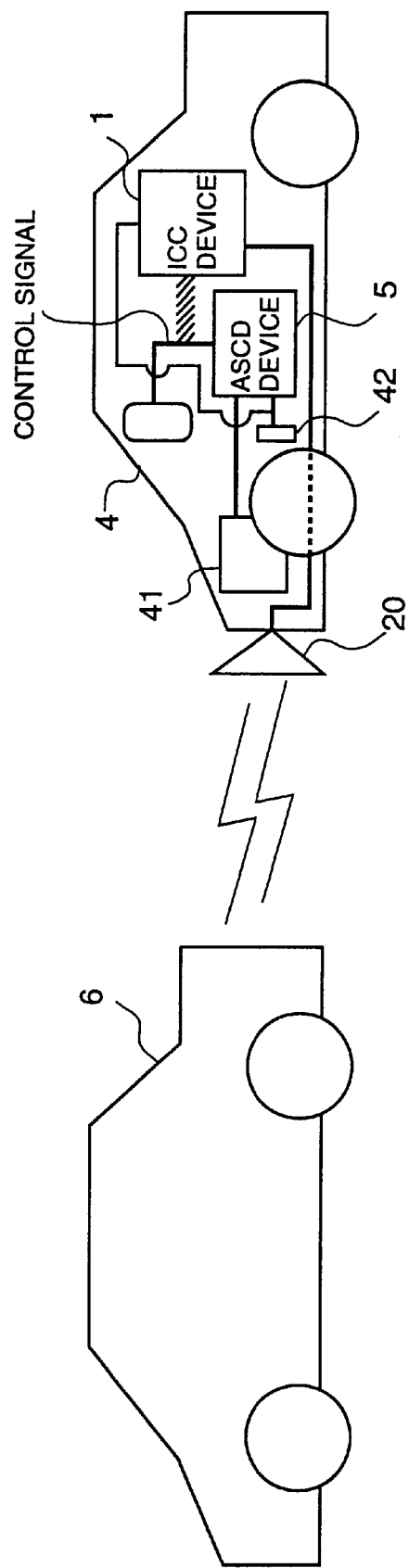
FIG. 1 is a diagram used for conceptually explaining follow-up cruise control carried out by using an ICC device implemented by a first embodiment of the present invention.

FIG. 1 is a diagram used for conceptually explaining follow-up cruise control carried out by using an ICC device implemented by a first embodiment of the present invention.

The ICC device 1 implemented by the first embodiment as shown in the figure is a so-called retrofittype ICC device for carrying out follow-up cruise control in conjunction with an existing ASCD device 5 already installed in a host vehicle 4. The ASCD device 5 is a device for carrying out auto cruise control by adjusting the output of the engine 41 in accordance with an operating signal used to be supplied by the driver so that the host vehicle 4 is running at a speed resulting from the adjustment of the output of the engine 41. Normally, there are three types of operating signals. The first operating signal is an acceleration signal for accelerating the host vehicle by opening the throttle valve to a predetermined degree of opening. On the other hand, the second operating signal is a deceleration signal for decelerating the host vehicle by closing the throttle valve. Finally, the third operating signal is a cancel signal to cancel the auto cruise control using the ASCD device 5.

The ICC device 1 implemented by the present embodiment uses information on the speed of the host vehicle 4 received from a speed sensor 42 and information on the range between the host vehicle 4 and a front vehicle 6 received from a radar unit 20 to determine the type of an operation required in order for the host vehicle 4 to follow up the front vehicle 6, that is, to determine whether the necessary operation is acceleration or deceleration, and supplies an operating signal to the ASCD device 5 in accordance with the determined required operation. In this way, automatic follow-up cruise control is carried out.

With the retrofit-type ICC device such as the ICC device 1 implemented by the present embodiment, it is possible to effectively utilize functions of the already existing ASCD device owned by the driver in the host vehicle, offering a merit that the cost of the ICC device can be reduced.

The following is description of a vehicle system for implementing an automatic follow-up cruise by means of the ICC device 1 implemented by the present embodiment.

Figure 2:
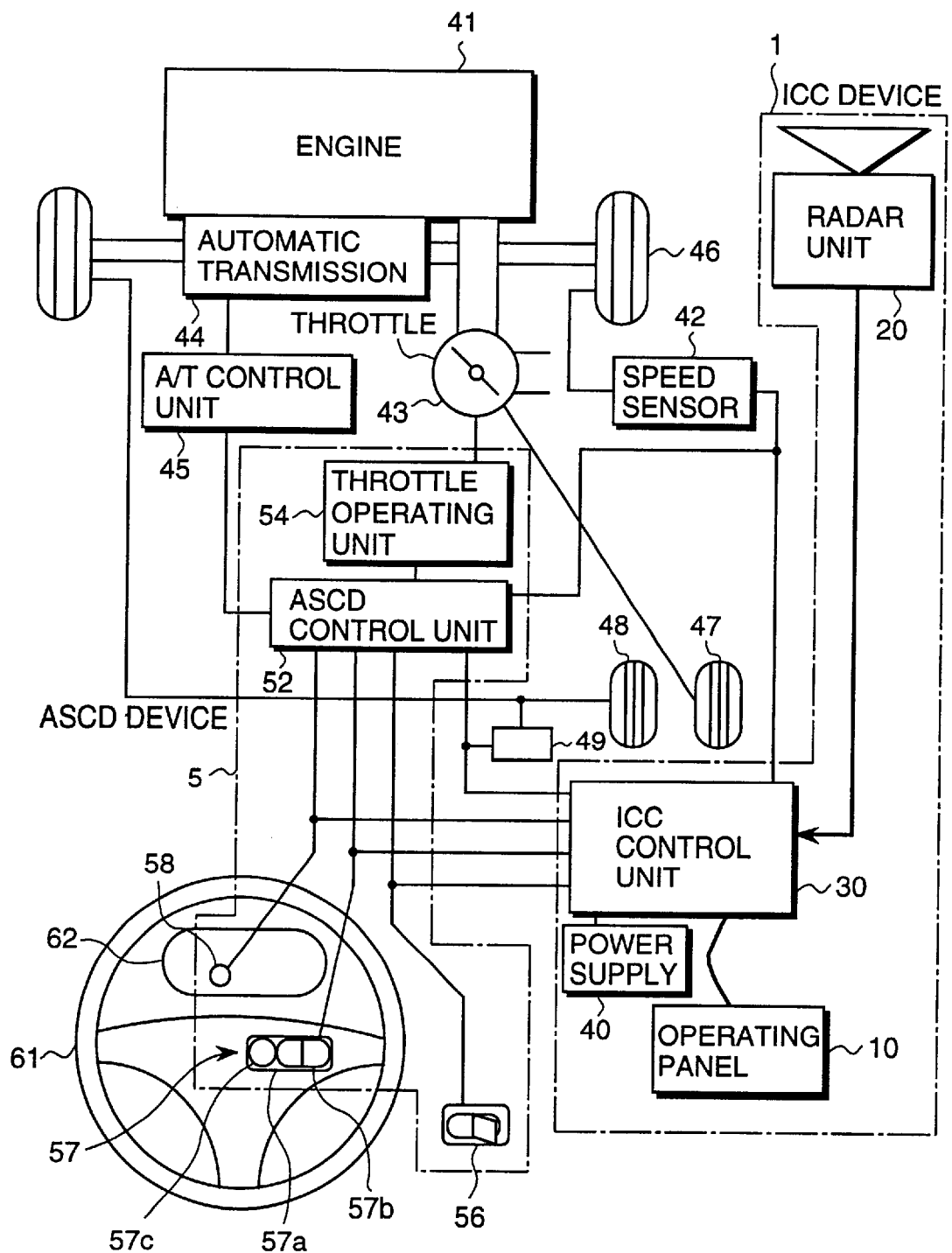
FIG. 2 is a schematic diagram showing the configuration of a vehicle system for implementing an automatic follow-up cruise by means of the ICC device shown in FIG. 1.

FIG. 2 is a skeleton diagram showing the configuration of a vehicle system for implementing an automatic follow-up cruise by means of the ICC device 1 implemented by the present embodiment. In the figure, reference numeral 41 denotes the engine cited above and reference numeral 42 is the aforementioned speed sensor for generating a speed signal with a pulse frequency proportional to the speed. Reference numerals 43 and 44 are the throttle valve cited above and an automatic transmission respectively. Reference numeral 45 is an A/T control unit for controlling the automatic transmission 44 and reference numeral 46 is a driven wheel. Reference numerals 47 and 48 are an accelerator pedal and a brake pedal respectively. Reference numeral 49 is a brake detecting sensor for outputting a brake signal by sensing the movement of the brake pedal 48 and reference numeral 61 is a steering wheel. Reference numeral 62 denotes a meter panel having, among other meters, a speed meter. In addition to the components described above, the configuration of the vehicle system shown in FIG. 2 also includes the ASCD device 5 and the ICC device 1 which are mounted on the vehicle.

As shown in FIG. 2, the ASCD device 5 comprises an ASCD control unit 52, a throttle valve operating unit 54, an ASCD power switch 56 for connecting a power supply to the ASCD device 5, an ASCD control switch 57 for forwarding an operation signal to the ASCD device 5 and an ASCD status lamp 58 for informing the driver of whether or not control is being carried out by the ASCD device 5. The ASCD control switch 57 is provided with a resume-acceleration switch 57a for inputting an acceleration signal for accelerating the host vehicle by opening the throttle valve 43 to a predetermined degree of opening, a set-coast switch 57b for inputting a deceleration signal for decelerating the host vehicle by closing the throttle valve 43 and a cancel switch 57c for inputting a cancel signal to cancel the auto cruise control using the ASCD device 5.

Next, auto cruise control carried out by means of the ASCD device 5 is explained as follows.

First of all, the driver turns on the ASCD power switch 56 to supply electric power to the ASCD device 5 and then operates the accelerator pedal 47 to let the host vehicle run at a desired speed. When the set-coast switch 57b is pressed while the host vehicle is running at the desired speed, the ASCD control unit 52 stores the speed indicated by a speed signal generated by the speed sensor 42 at the time the set-coast switch 57b is pressed, starting the auto cruise control so as to let the host vehicle run in an automatic cruise at the stored speed. Thereafter, the ASCD control unit 52 compares a speed indicated by the speed signal transmitted from time to time by the speed sensor 42 with the stored speed. If the speed indicated by the speed signal generated by the speed sensor 42 is found lower than the stored speed, a control signal is transmitted to the throttle valve operating unit 54 so as to open the throttle valve 43 to a predetermined degree of opening. Receiving the control signal, the throttle valve operating unit 54 opens the throttle valve 43 to the predetermined degree of opening, keeping the throttle valve 43 opened as it is as long as the control signal is being transmitted thereto. If the speed indicated by the speed signal generated by the speed sensor 42 is found higher than the stored speed, on the other hand, a control signal is transmitted to the throttle valve operating unit 54 so as to close the throttle valve 43. In this way, the host vehicle can run in an automatic cruise at the desired speed without the need for the driver to operate the accelerator pedal 47.

If the resume-acceleration switch 57a of the ASCD control switch 57 is pressed by the driver while the auto cruise control is being carried out, the ASCD device 5 receives an acceleration signal, supplying it to the ASCD control unit 52.

Receiving the acceleration signal, the ASCD control unit 52 supplies a control signal to the throttle valve operating unit 54 so as to open the throttle valve 43 to a predetermined degree of opening. Receiving the control signal, the throttle valve operating unit 54 opens the throttle valve 43 to the predetermined degree of opening, keeping the throttle valve 43 opened as it is as long as the control signal is being transmitted thereto. As the resume-acceleration switch 57a is released by the driver, the ASCD control unit 52 stores the speed indicated by a speed signal generated by the speed sensor 42 at the time the resume-acceleration switch 57a is released, starting the auto cruise control so as to let the host vehicle run in an automatic cruise at the stored speed.

If the set-coast switch 57b of the ASCD control switch 57 is pressed by the driver while the auto cruise control is being carried out, the ASCD device 5 receives a deceleration signal, supplying it to the ASCD control unit 52.

Receiving the deceleration signal, the ASCD control unit 52 supplies a control signal to the throttle valve operating unit 54 so as to close the throttle valve 43. Receiving the control signal, the throttle valve operating unit 54 closes the throttle valve 43, keeping the throttle valve 43 closed as it is as long as the control signal is being transmitted thereto.

As the set-coast switch 57b is released by the driver, the ASCD control unit 52 stores the speed indicated by a speed signal generated by the speed sensor 42 at the time the set-coast switch 57b is released, starting the auto cruise control so as to let the host vehicle run in an automatic cruise at the stored speed.

If the cancel switch 57c of the ASCD control switch 57 is pressed by the driver while the auto cruise control is being carried out, the ASCD device 5 receives a cancel signal, supplying it to the ASCD control unit 52.

Receiving the cancel signal, the ASCD control unit 52 temporarily suspends the auto cruise control. In addition, when a brake signal generated by the brake detecting sensor 49 is received, the ASCD control unit 52 also temporarily suspends the auto cruise control as well. The temporary suspension of the auto cruise control is terminated when the driver presses the resume-acceleration switch 57a.

The ICC device 1 implemented by the first embodiment of the present invention is explained in detail as follows.

Figure 3:
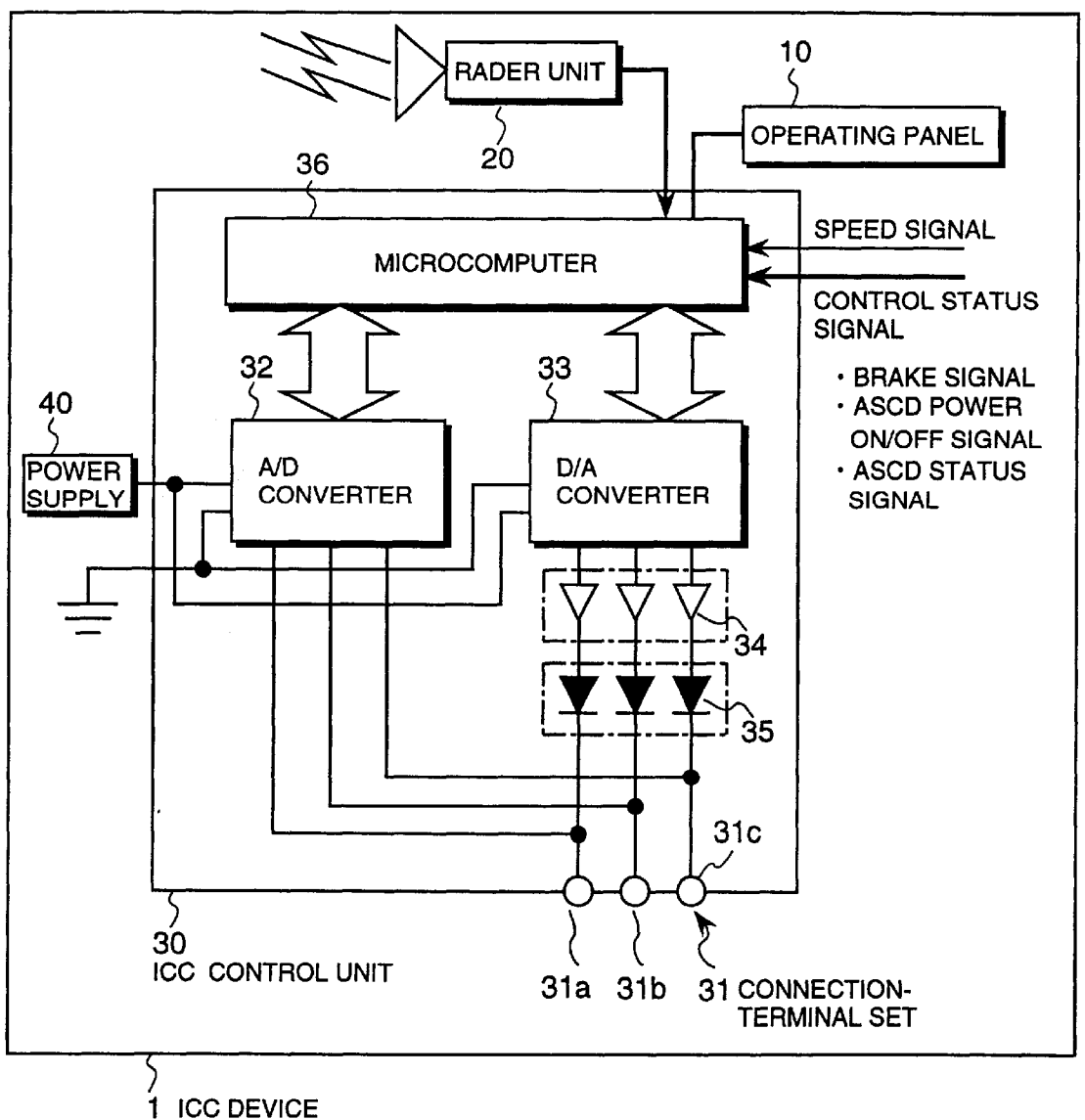
FIG. 3 is a schematic diagram showing the configuration of the ICC device implemented by the first embodiment of the present invention.
Figure 4:
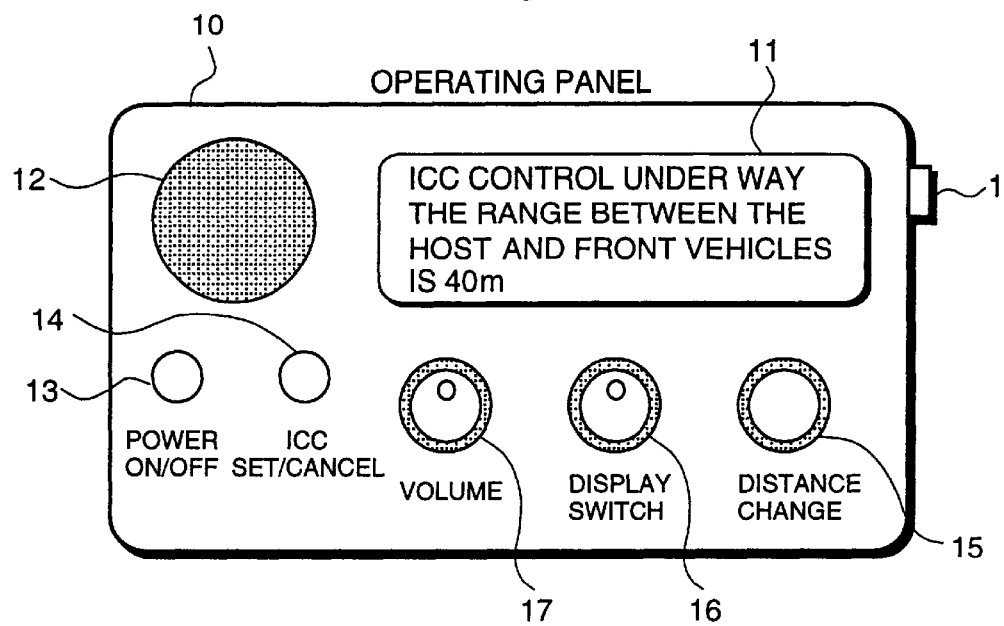
FIG. 4 is a schematic diagram showing the configuration of an operating panel shown in FIG. 3.
Figure 5:
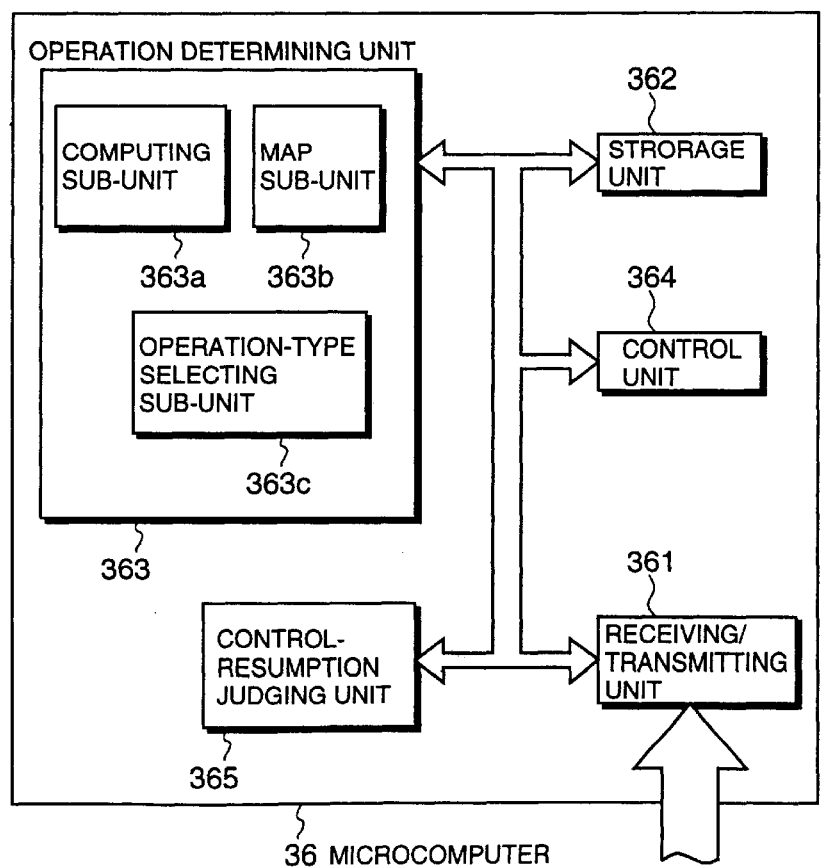
FIG. 5 is a schematic functional block diagram showing a microcomputer shown in FIG. 3.

FIG. 3 is a skeleton diagram showing the configuration of the ICC device implemented by the first embodiment of the present invention and FIG. 4 is a skeleton diagram showing the configuration of an operating panel shown in FIG. 3. FIG. 5 is a skeleton functional block diagram showing a microcomputer shown in FIG. 3.

As shown in FIGS. 2 and 3, the ICC device 1 implemented by the present embodiment comprises the operating panel 10 cited above, the radar unit 20 mentioned earlier, an ICC control unit 30 and a power supply 40.

The operating panel 10 forwards a command entered by the driver to the ICC control unit 30 and informs the driver of information received from the ICC control unit 30. As shown in FIG. 4, the operating panel 10 comprises a display unit 11 for displaying the range between the host and front vehicles, the closing rate of the host vehicle with respect to the front vehicle and the control status of the ICC device 1 such as accelerating and decelerating, a speaker 12 for generating an alarm sound in case the relation between the host and front vehicles enters a dangerous state, an ICC power on/off switch 13 for supplying power generated by a power supply to the ICC device 1, an ICC set/cancel switch 14 for putting the follow-up cruise control by means of the ICC device 1 in an enabled state, a distance change switch 15 for adjusting a range between the host and front vehicles set in advance, a display change-over switch 16 for changing the display of information on the display unit 11 from one to another, a volume adjusting switch 17 for adjusting the volume of the speaker 12 and a tuning switch 18 for tuning the operating signal. The tuning means work to store the states of implementation of the operating signals, that is, the acceleration, deceleration and cancel signals, of the ASCD device 5 installed in the host vehicle to be used in conjuction with the ICC device 1 implemented by the present embodiment. It should be noted that the tuning will be described more later.

The radar unit 20 is used for detecting a range between the host vehicle and a front vehicle running in front of the host vehicle. The radar unit 20 can be a radar apparatus of any type such as a wave radar apparatus or a laser radar apparatus as long as the apparatus is capable of measuring a distance.

As shown in FIG. 3, the ICC control unit 30 comprises a connection-terminal set 31 having a plurality of connection terminals 31a to 31c, a multi-channel A/D converter 32 having as many channels as the connection terminals 31a to 31c of the connection-terminal set 31, a multi-channel D/A converter 33 having as many channels as the connection terminals 31a to 31c of the connection-terminal set 31, as many amplifiers 34 as the connection terminals 31a to 31c of the connection-terminal set 31, as many diodes 35 as the connection terminals 31a to 31c of the connection-terminal set 31 and a microcomputer 36. The amplifiers 34 are each used for preventing the level of a signal output by the multi-channel D/A converter 33 from being affected by the impedance of a signal line connected to an output terminal of the multi-channel D/A converter 33. On the other hand, the diodes 35 are used for preventing currents from reversely flowing into the output sides of the amplifiers 34.

The connection-terminal set 31 is used for connecting the ICC control unit 30 to signal lines for supplying the operating signals, that is, the acceleration, deceleration and cancel signals, of the ASCD control unit 52. As explained in the description of the conventional technology, the states of implementation of the operating signals of the ASCD device, that is, the acceleration, deceleration and cancel signals, may vary from manufacturer to manufacturer. For this reason, it is desirable to provide three connection terminals to the connection-terminal set 31 on the assumption that the acceleration, deceleration and cancel signals are transmitted through three different signal lines. In this way, the ICC control unit 30 can be connected to the signal lines of the ASCD device through which the operating signals are transmitted without regard to the states of implementation of the operating signals. In order to allow the ICC control unit 30 to be connected to the signal lines for transmitting the operating signals of the ASCD device 110 shown in FIG. 13 and the ASCD device 138 shown in FIG. 5, representative ASCD devices, at least two connection terminals are required.

Input terminals of the multi-channel A/D converter 32 are connected to the connection terminals 31a to 31c of the connection-terminal set 31. The multi-channel A/D converter 32 is used for converting an analog signal supplied to each of the input terminals thereof into a digital signal which is then asserted on an output terminal corresponding to the input terminal to which the analog signal is supplied.

On the other hand, output channel terminals of the multi-channel D/A converter 33 are connected to the connection terminals 31a to 31c of the connection-terminal set 31 through the amplifiers 34 and the diodes 35. The multi-channel D/A converter 33 is used for converting a digital signal supplied to each input terminal thereof into an analog signal which is then asserted on an output terminal corresponding to the input terminal to which the digital signal is supplied.

The microcomputer 36 carries out various kinds of processing required in the follow-up cruise control carried out by means of the ICC device 1. As shown in FIG. 5, the microcomputer 36 comprises a receiving/transmitting unit 361, a storage unit 362, an operation judging unit 363, a control unit 364 and a control-resumption judging unit 365. It should be noted that pieces of processing in the operation judging unit 363, the control unit 364 and the control-resumption judging unit 365 are carried out by executing software programs stored in a memory unit employed in the microcomputer 36.

The receiving/transmitting unit 361 receives the operating signals of the ASCD device 5 transmitted thereto by way of the multi-channel A/D converter 32, the speed signal generated by the speed sensor 42, a signal generated by the radar unit 20 to represent the range between the host vehicle and a front vehicle running in front of the host vehicle, a signal generated by the operating panel 10 and signals to indicate the control status of the ASCD device 5. The control status signals are a brake signal generated by the brake detecting sensor 49, a signal indicating the on/off state of the ASCD power switch 56 and a signal indicating the blinking/off status of an ASCD status lamp. In addition, the operating signals of the ASCD device 5 are transmitted to the D/A converter 33.

The storage unit 362 is used for storing information for identifying the operating signals of the ASCD device 5. To be more specific, the storage unit 362 is used for storing information for identifying each of the acceleration, deceleration and cancel signals. It should be noted that the information for identifying the operating signals of the ASCD device 5 is stored in the storage unit 362 in a tuning process to be described more later.

The operation judging unit 363 is used for determining the type of an operation (either acceleration or deceleration) required in order for the host vehicle to follow up a front vehicle running in front of the host vehicle while maintaining a safe range between the host and front vehicles. The operation judging unit 363 comprises a computing sub-unit 363a, a map sub-unit 363b and an operation-type selecting sub-unit 363c.

The computing sub-unit 363a is used for computing a time interval, the length of time it takes for the host vehicle to arrive at the location of a front vehicle by assuming that the front vehicle is halted and a closing rate of the host vehicle with respect to the front vehicle from the speed signal generated by the speed sensor 42 and a signal generated by the laser unit 20 to represent the range between the host and front vehicles. It should be noted that the time interval is also referred to hereafter as a time interval.

It is worth noting that the time interval can be computed in accordance with the following equation:

Time interval=Range/speed

On the other hand, the closing rate can be found in accordance with the following equation:

closing rate=−(Range−Range after $t$-second time lapse)/$t$ seconds

A map stored in the map sub-unit 363b shows relations among the range between the host and front vehicles, the closing rate of the host vehicle with respect to the front vehicle and the types of an operation: acceleration and deceleration.

Figure 6:
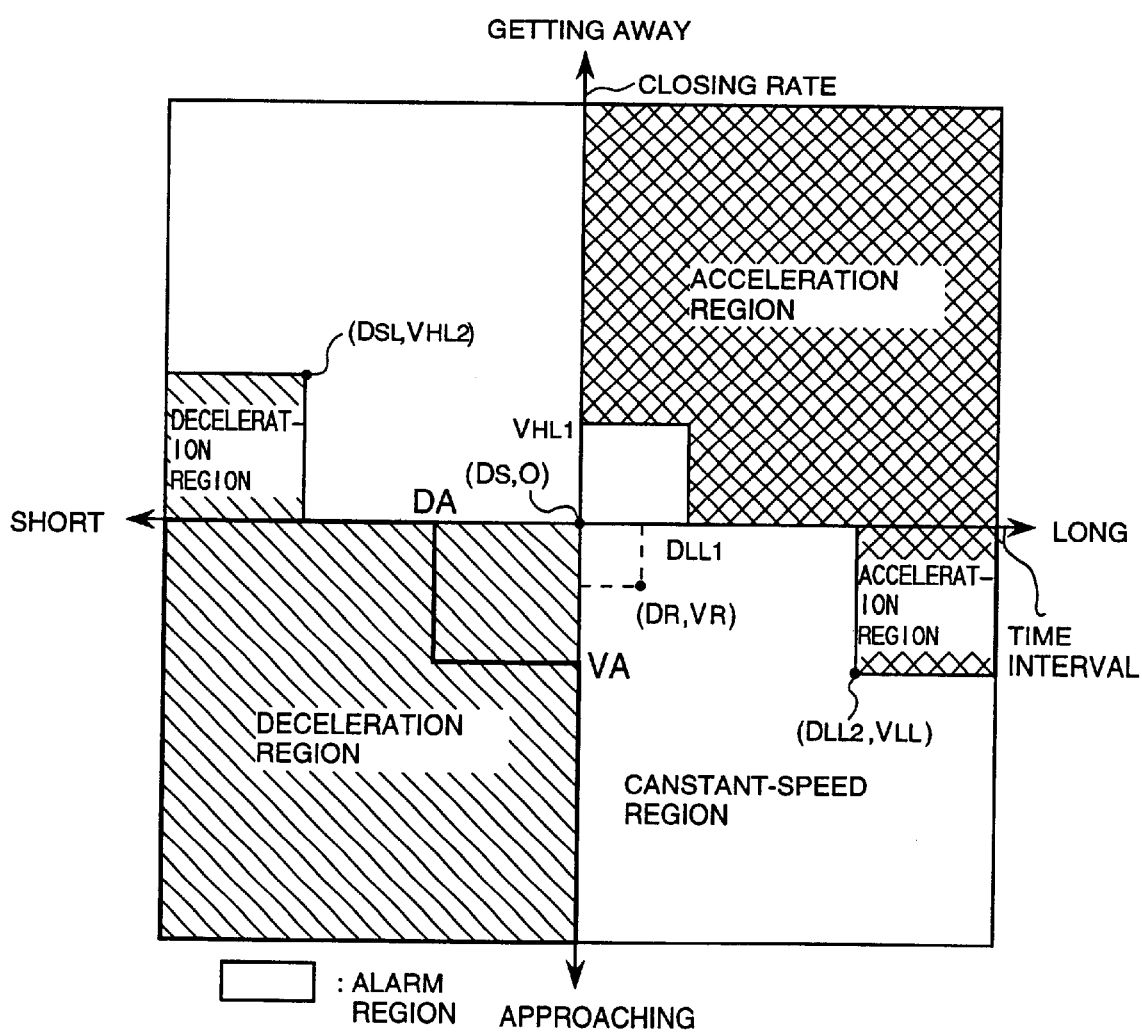
FIG. 6 is a diagram used for explaining a map showing relations among the range between the host vehicle and a front vehicle, the closing rate of the host vehicle with respect to the front vehicle and the types of operation, that is, acceleration and deceleration.

FIG. 6 is a diagram showing the map. The map is a coordinate system in which the closing rate and the time interval are taken as the vertical and the horizontal axes respectively. The origin of the coordinate system represents a time interval $D_s$ and a closing rate of zero. The time interval $D_s$ is a time interval at a point in time when the driver turns on the ICC set/cancel switch 14, that is, a point in time when the follow-up cruise control by ICC device 1 implemented by the present embodiment is started. The types of operations required to take the present time interval between the host and front vehicles to the time interval at the point of time the driver turns on the ICC set/cancel switch 14 are assigned to predetermined areas in the coordinate system.

The third quadrant (the area with the time interval<$D_s$ and the closing rate<0) of the map shown in FIG. 6 is allocated to a deceleration region. With the time interval<$D_s$ and the closing rate<0, the range between the host and front vehicles is shorter than the range at the point of time the driver turns on the ICC set/cancel switch 14 which is also referred to hereafter as a target range and, since the host vehicle tends to approach the front vehicle, in this state, the range will become further shorter than the target range. Therefore, the third quadrant is allocated to the deceleration region in order to carry out deceleration as the speed and the range fall into the third quadrant. In particular, in a sub-area of the third quadrant where the time interval≦DA or in a sub-area of the third quadrant where the closing rate≦VA, it is necessary for the driver to operate the brake pedal on the driver's own judgment. These sub-areas are therefore allocated to an alarm region.

The first quadrant (the area with the time interval>$D_s$ and the closing rate>0) of the map shown in FIG. 6 is allocated to an acceleration region. With the time interval>$D_s$ and the closing rate>0, the range between the host and front vehicles is longer than the target range and, since the host vehicle tends to further get away from the front vehicle, in this state, the range will become further longer than the target range. Therefore, the first quadrant is allocated to the acceleration region in order to carry out acceleration as the speed and the range fall into the first quadrant. If the sub-area in the first quadrant in close proximity to the origin at which the time interval=$D_s$ and the closing rate=0 is also allocated to the acceleration region, it is feared that acceleration and deceleration will be repeated alternately in case the range and the closing rate computed by the computing sub-unit 363a fall into a location between the first and third quadrant. For this reason, in the present embodiment, a sub-area in the first quadrant where the time interval≦$D_{LL1}$ and the closingrate≦$V_{HL1}$ rate allocated to a constant-speed region, a region in which neither acceleration nor deceleration is carried out.

The second quadrant (the area with the time interval>$D_s$ and the closing rate<0) of the map shown in FIG. 6 is allocated to the constant-speed region except for a sub-area therein to be described later. As described above, the constant-speed region is a region in which neither acceleration nor deceleration is carried out. With the time interval>$D_s$ and the closing rate<0, the range between the host and front vehicles is longer than the target range but, since the host vehicle tends to approach the front vehicle, in this state, the range will eventually become equal to the target range. Therefore, the second quadrant is allocated to the constant-speed region in order to carry out neither deceleration nor acceleration, that is, in order to put the host vehicle in a constant-speed cruise, as the speed and the range fall into the second quadrant. With the range between the host and front vehicles much longer than the target range and the closing rate having a negative value close to zero, however, it conceivably takes time to bring the present range to the target range. For this reason, in the present embodiment, the sub-area in the second quadrant cited where the time interval≧$D_{LL2}$ and the closing rate≦$V_{LL}$ is also allocated to the acceleration region.

Much like the second quadrant, the fourth quadrant (the area with the time interval<$D_s$ and the closing rate>0) of the map shown in FIG. 6 is allocated to the constant-speed region except for a sub-area therein to be described later. As described above, the constant-speed region is a region in which neither acceleration nor deceleration is carried out. With the time interval<$D_s$ and the closing rate>0, the range between the host and front vehicles is shorter than the target range but, since the host vehicle tends to get away from the front vehicle, in this state, the range will eventually become equal to the target range. Therefore, the fourth quadrant is allocated to the constant-speed region in order to carry out neither deceleration nor acceleration, that is, in order to put the host vehicle in a constant-speed cruise, as the speed and the range fall into the fourth quadrant. With the range between the host and front vehicles much shorter than the target range and the closing rate having a positive value close to zero, however, it conceivably takes time to bring the present range to the target range. For this reason, in the present embodiment, the sub-area in the fourth quadrant cited above where the time interval≦$D_{SL}$ and the closing rate≦$V_{HL2}$ is also allocated to the deceleration region.

It should be noted that the ICC device 1 can also be designed in such a way that the driver can appropriately set and change threshold values of the regions of the map shown in FIG. 6.

The operation-type selecting sub-unit 363c plots a point representing the time interval $D_r$ between the host and front vehicles and the closing rate $V_r$ of the host vehicle with respect to the front vehicle at the present time computed by the computing sub-unit 363a on the map stored in the map sub-unit 363b in order to determine the type of a required operation. For example, if the values of the time interval $D_r$ and the closing rate $V_r$ computed by the computing sub-unit 363a are 0<$D_r$<$D_{LL2}$ and $V_r$<0 respectively, the point representing the time interval Dr and the closing rate $V_r$ is plotted on the constant-speed region as shown in FIG. 6. In this case, neither acceleration nor deceleration is carried out.

The control unit 364 controls the elements composing the microcomputer 36 as a whole. In tuning to be described more later, for example, information for identifying the operating signals of the ASCD device 5 is stored by the control unit 364 in the storage unit 362. In addition, the control unit 364 reads out information on an operating signal for an operation determined by the operation determining unit 363 from the storage unit 362, transferring the information to the receiving/transmitting unit 361. The control unit 364 also temporarily suspends the processing of the operation determining unit 363 and other processing in accordance with signals indicating the control status of the ASCD device 5 received by the receiving/transmitting unit 361. The control status signals include a brake signal generated by the brake detecting sensor 49, a signal indicating the on/off state of the ASCD power switch 56 and a signal indicating the blinking/off status of the ASCD status lamp. Furthermore, the control unit 364 resumes the processing of the operation determining unit 363 and other processing, which were temporarily suspended in accordance with a command issued by the control-resumption judging unit 365. Further, the control unit 364 monitors information for identifying an operating signal of the ASCD device 5 received through the receiving/transmitting unit 361. If the control unit 364 detects an operating signal supplied to the ASCD control unit 52 as a result of an operation carried out by the driver on the ASCD control switch 57, the control unit 364 exercises control so as to prevent an operating signal generated by the ICC device 1 from being supplied to the ASCD control unit 52.

In case the processing of the operation determining unit 363 and other processing were temporarily suspended by the control unit 364, the control-resumption judging unit 365 forms a judgment as to whether or not a predetermined condition is satisfied after a predetermined period of time has lapsed since the suspension of the pieces of processing. If the outcome of the judgment indicates that the predetermined condition is satisfied, the control-resumption judging unit 365 issues a command to the control unit 364 to resume the processing of the operation determining unit 363 and other processing which were temporarily suspended by the control unit 364.

The following is description of operations carried out by the ICC device 1 implemented by the present embodiment.

The description begins with explanation of the tuning, processing to store information for identifying the operating signals of the ASCD device 5, that is, the acceleration, deceleration and cancel signals. It should be noted that the tuning process is the first initialization which is carried out at the time the ICC device 1 is installed in a host vehicle.

Figure 7:
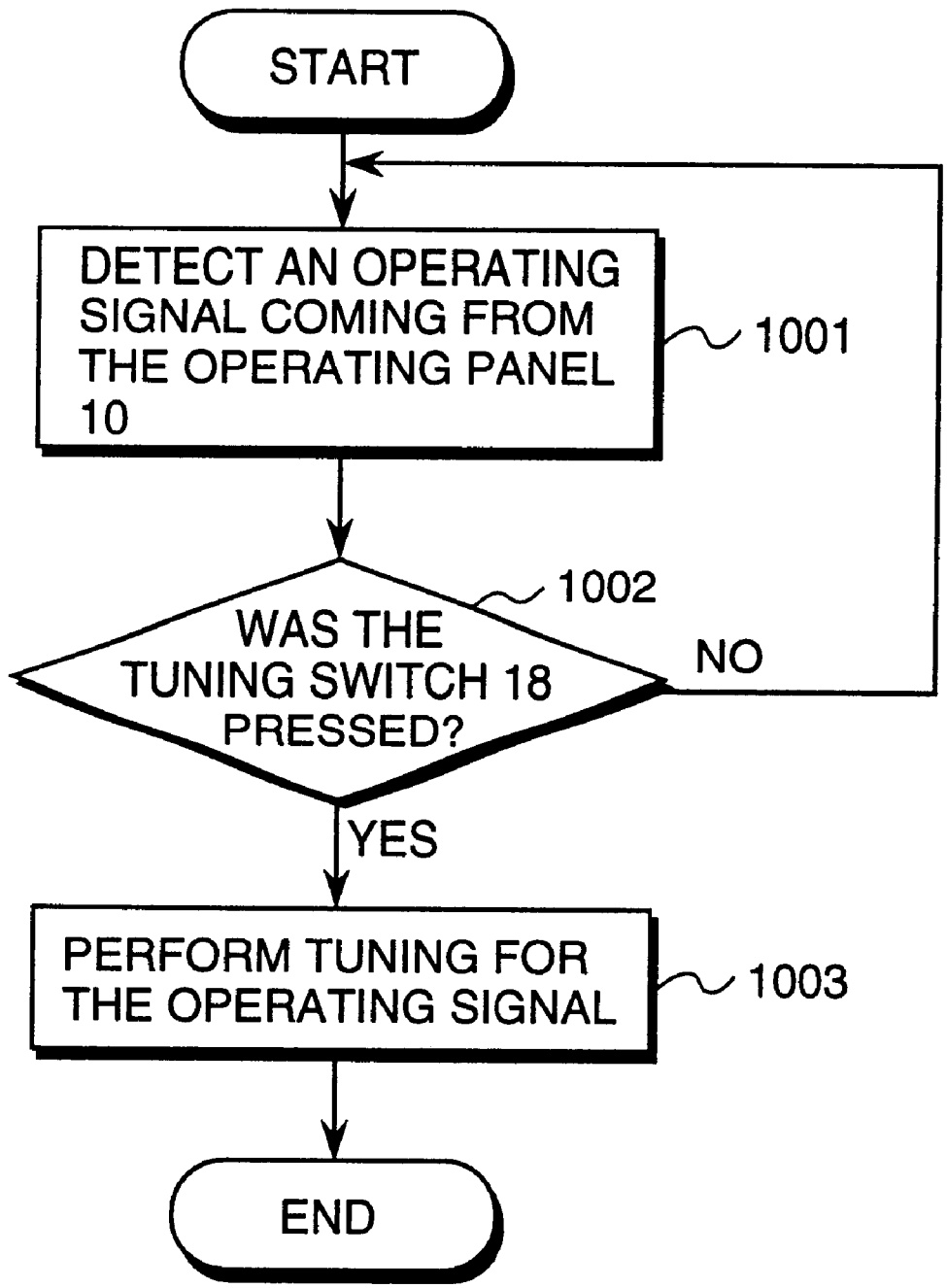
FIG. 7 is a flowchart used for explaining a procedure for starting a tuning process.
Figure 8:
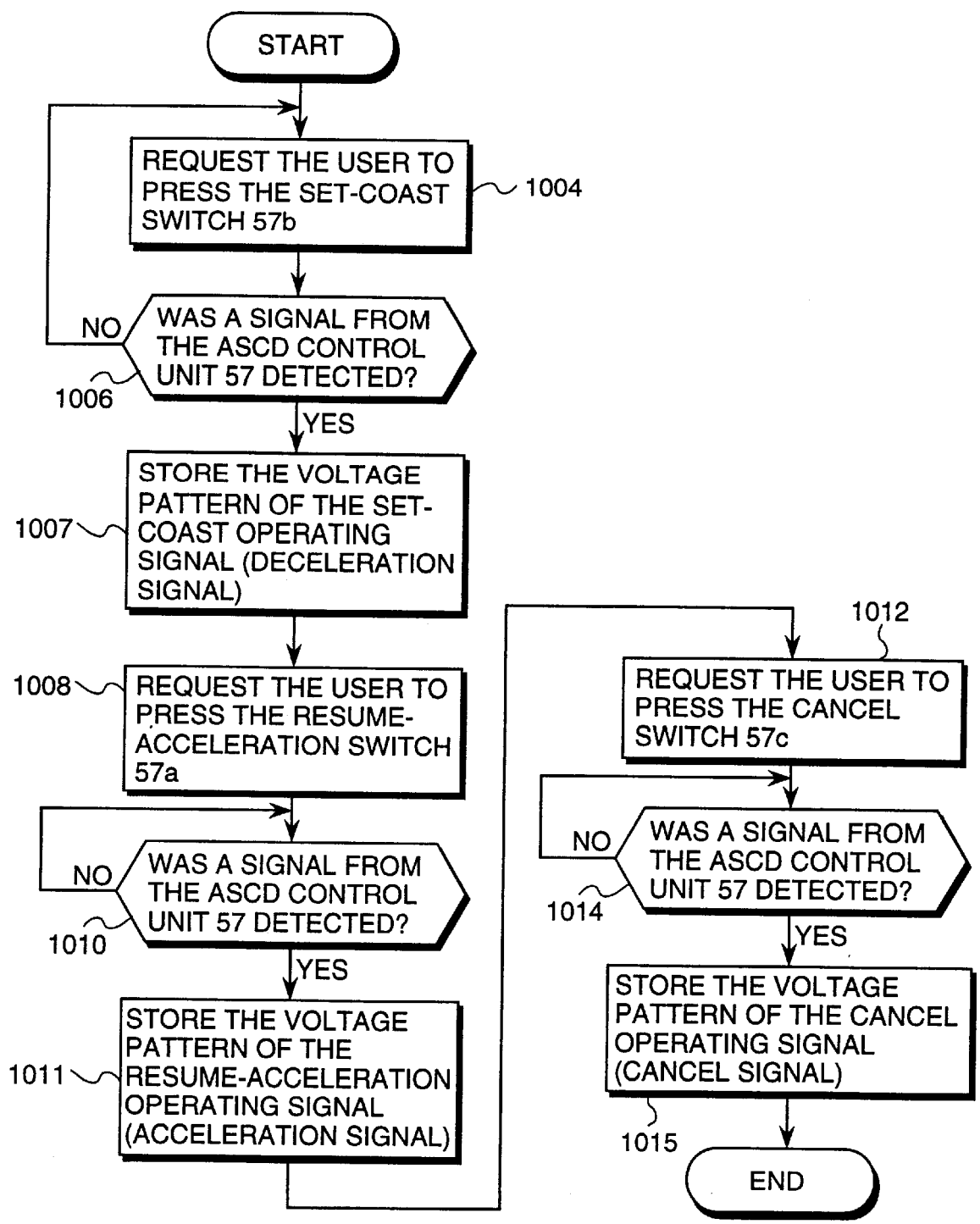
FIG. 8 is a flowchart used for explaining the tuning process.

FIG. 7 is a flowchart used for explaining a procedure for starting the tuning process and FIG. 8 is a flowchart used for explaining the tuning process.

As shown in FIG. 7, the flowchart begins with a step 1001 at which the control unit 364 employed in the microcomputer 36 detects a signal received by the receiving/transmitting unit 361 from the operating panel 10. The flow of processing then goes on to a step 1002 at which the control unit 364 forms a judgment as to whether or not the tuning switch 18 of the operating panel 10 has been pressed. If the tuning switch 18 has not been pressed yet, the flow returns to the step 1001 to repeat the processing, waiting for the tuning switch 18 to be pressed. If the tuning switch 18 has been pressed, on the other hand, the flow proceeds to a step 1003 to carry out the tuning process shown in FIG. 8.

As shown in FIG. 8, the flowchart begins with a step 1004 at which the control unit 364 outputs a message through the display unit 11 of the operating panel 10 or the speaker 12, requesting the driver to press the set-coast switch 57*b* of the ASCD control switch 57. The flow of processing then goes on to a step 1006 at which the control unit 364 forms a judgment as to whether or not a signal received by the receiving/transmitting unit 361 from the ASCD control switch 57 has been detected. If the outcome of the judgment formed at the step 1006 indicates that a signal received by the receiving/transmitting unit 361 from the ASCD control switch 57 has been detected, the flow of processing goes on to a step 1007 at which the control unit 364 stores the state of implementation of the signal, which was generated when the set-coast switch 57*b* was pressed, in the storage unit 362 as information on a deceleration signal. Practically speaking, the control unit 364 determines which of the connection terminals 31*a* to 31*c* of the connection-terminal set 31 of the microcomputer 36 the signal detected at the step 1006 has been supplied through and what level in terms of voltages the signal detected at the step 1006 has been received at. The control unit 364 then stores information for identifying the connection terminal 31*a*, 31*b* or 31*c* and information for identifying the voltage level detected at the step 1006 in the storage unit 362 as information for identifying a deceleration signal.

The flow of processing then proceeds to a step 1008 at which the control unit 364 outputs a message through the display unit 11 of the operating panel 10 or the speaker 12, requesting the driver to press the resume-acceleration switch 57*a* of the ASCD control switch 57. The flow of processing then goes on to a step 1010 at which the control unit 364 forms a judgment as to whether or not a signal received by the receiving/transmitting unit 361 from the ASCD control switch 57 has been detected. If the outcome of the judgment formed at the step 1010 indicates that a signal received by the receiving/transmitting unit 361 from the ASCD control switch 57 has been detected, the flow of processing goes on to a step 1011 at which the control unit 364 stores the state of implementation of the signal, which was generated when the resume-acceleration switch 57*a* was pressed, in the storage unit 362 as information on an acceleration signal. Practically speaking, the control unit 364 determines which of the connection terminals 31*a* to 31*c* of the connection-terminal set 31 of the microcomputer 36 the signal detected at the step 1010 has been supplied through and what level in terms of voltages the signal detected at the step 1010 has been received at. The control unit 364 then stores information for identifying the connection terminal 31*a*, 31*b* or 31*c* and information for identifying the voltage level detected at the step 1010 in the storage unit 362 as information for identifying an acceleration signal.

Then, the flow of processing proceeds to a step 1012 at which the control unit 364 outputs a message through the display unit 11 of the operating panel 10 or the speaker 12, requesting the driver to press the cancel switch 57*c* of the ASCD control switch 57. The flow of processing then goes on to a step 1014 at which the control unit 364 forms a judgment as to whether or not a signal received by the receiving/transmitting unit 361 from the ASCD control switch 57 has been detected. If the outcome of the judgment formed at the step 1014 indicates that a signal received by the receiving/transmitting unit 361 from the ASCD control switch 57 has been detected, the flow of processing goes on to a step 1015 at which the control unit 364 stores the state of implementation of the signal, which was generated when the cancel switch 57*c* was pressed, in the storage unit 362 as information on a cancel signal. Practically speaking, the control unit 364 determines which of the connection terminals 31*a* to 31*c* of the connection-terminal set 31 of the microcomputer 36 the signal detected at the step 1014 has been supplied through and what level in terms of voltages the signal detected at the step 1014 has been received at. The control unit 364 then stores information for identifying the connection terminal 31*a*, 31*b* or 31*c* and information for identifying the voltage level detected at the step 1014 in the storage unit 362 as information for identifying a cancel signal.

The following is description of the information for identifying the states of implementation of the acceleration, deceleration and cancel signals stored in the storage unit 362 in the tuning process according to the flowchart shown in FIG. 8.

Figure 23:
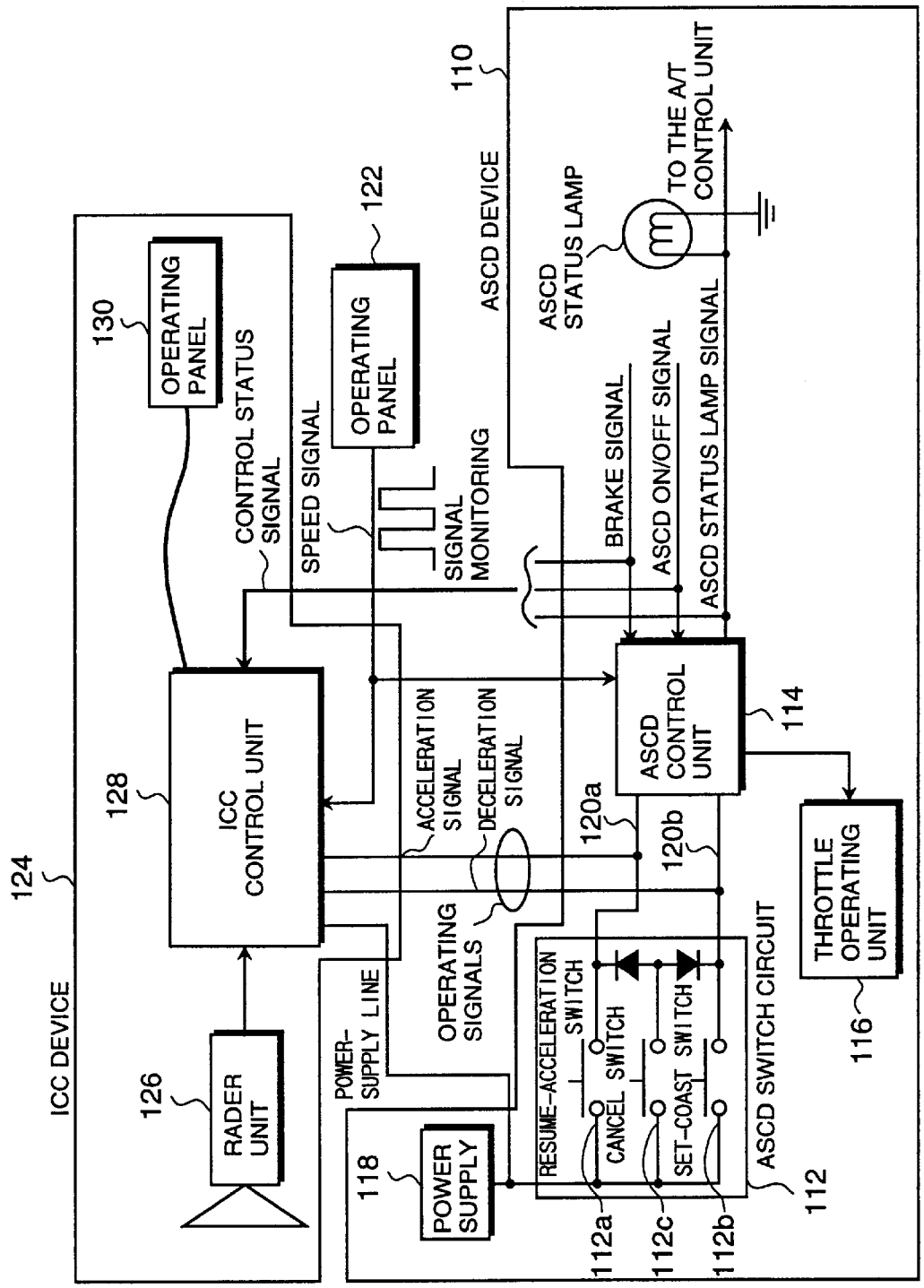
FIG. 23 is a schematic diagram showing the configuration of a cruise control apparatus comprising a representative ASCD device and a conventional ICC device used in conjunction with the ASCD device.
Figure 24:
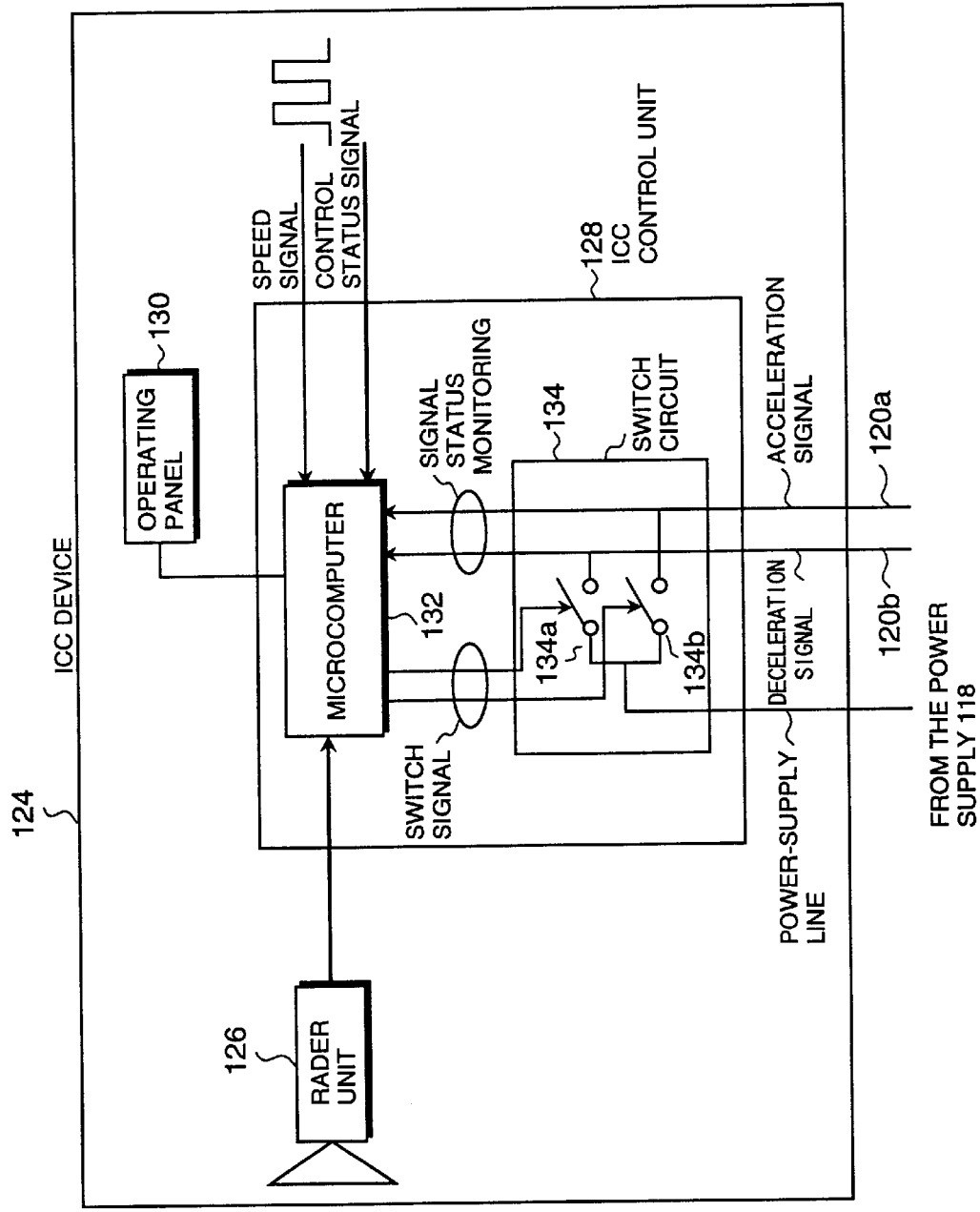
FIG. 24 is a schematic diagram showing the configuration of the conventional ICC device shown in FIG. 23.

The description begins with explanation of a case in which the ICC device 1 implemented by the present invention is applied to the ASCD device 110 shown in FIG. 23.

Figure 9:
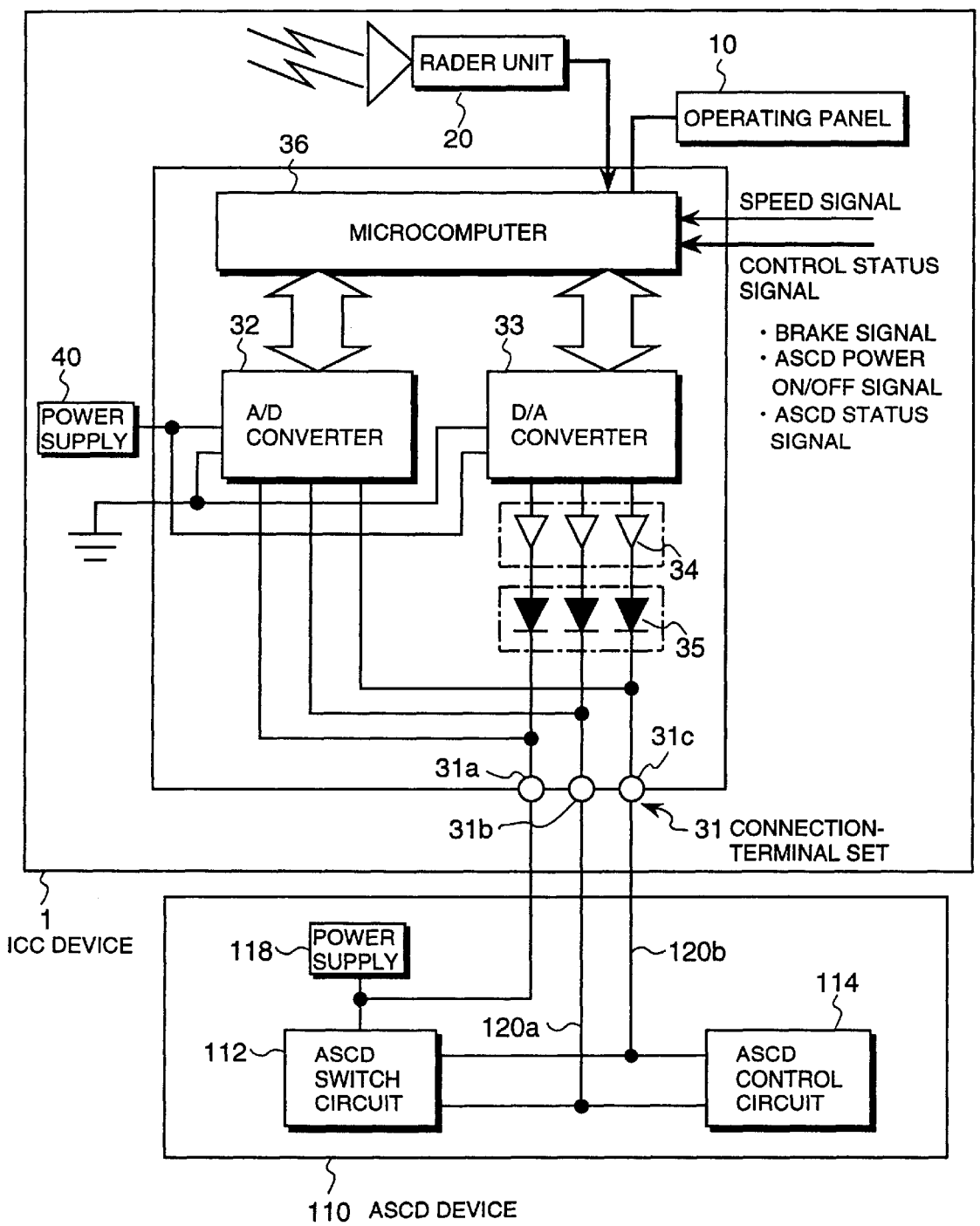
FIG. 9 is a diagram showing a system in which the ICC device implemented by the first embodiment of the present invention is used in conjunction with an ASCD device shown in FIG. 23.

FIG. 9 is a diagram showing a system in which the ICC device 1 implemented by the present embodiment is used in conjunction with an ASCD device 110 shown in FIG. 23.

As shown in FIG. 9, signal lines 120*a* and 120*b* of an ASCD switch circuit 112 through which the operating signals are transmitted are connected to the connection terminals 31*b* and 31*c* of the connection-terminal set 31 respectively. In this case, information on the states of implementation of the acceleration, deceleration and cancel signals is stored in the storage unit 362 as follows.

Acceleration Signal:
Connection terminal for inputting the signal: Connection terminal 31*b*
Voltage level of the signal: The voltage of the power supply 118
Deceleration Signal:
Connection terminal for inputting the signal: Connection terminal 31*c*
Voltage level of the signal: The voltage of the power supply 118
Cancel Signal:
Connection terminals for inputting the signal: Connection terminals 31*b* and 31*c*
Voltage level of the signal: The voltage of the power supply 118

Figure 25:
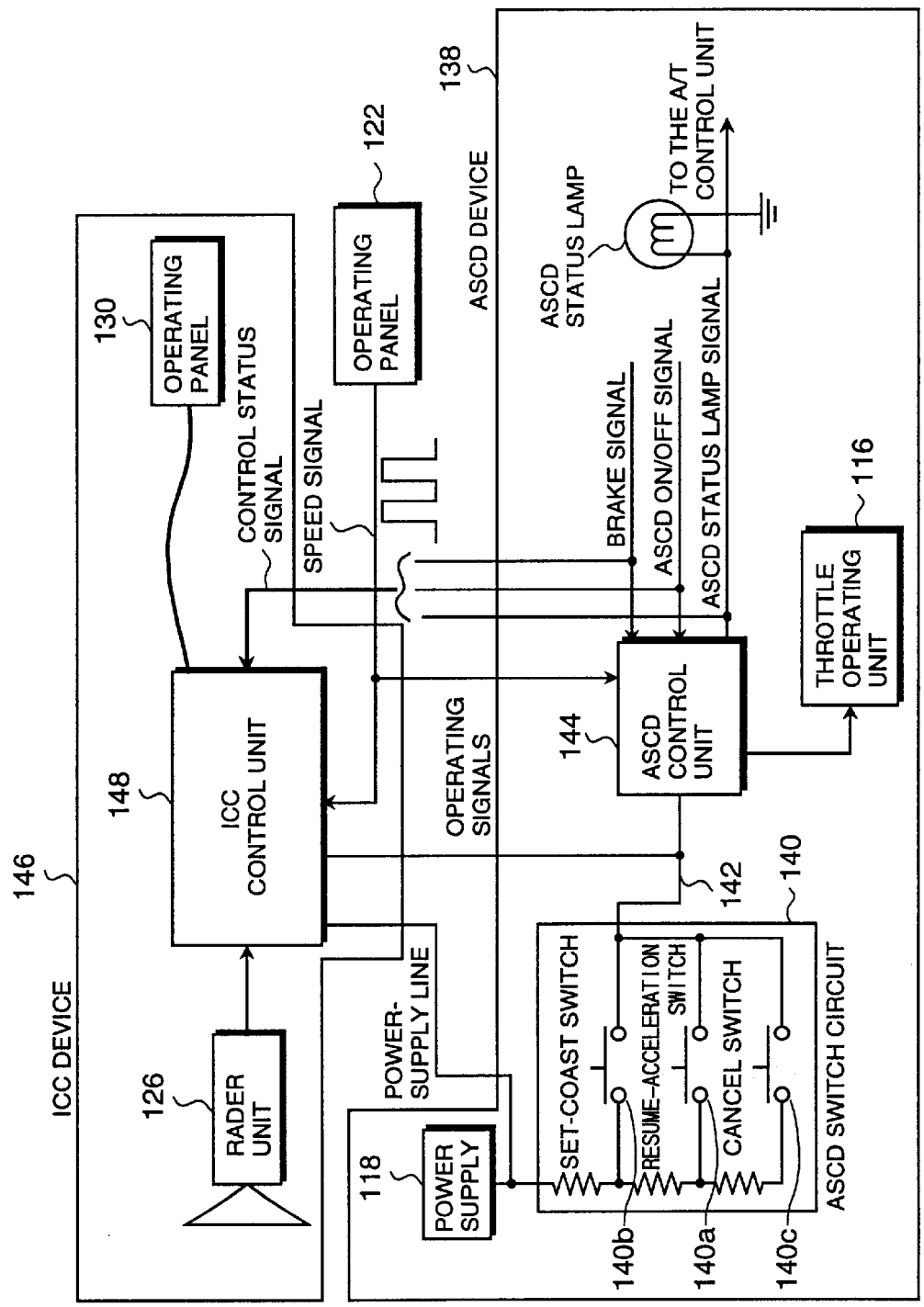
FIG. 25 is a schematic diagram showing the configuration of a cruise control apparatus comprising a representative ASCD device having specifications different from the ASCD device shown in FIG. 23 and a conventional ICC device used in conjunction with the ASCD device.

The description continues with explanation of a case in which the ICC device 1 implemented by the present invention is applied to the ASCD device 138 shown in FIG. 25.

Figure 10:
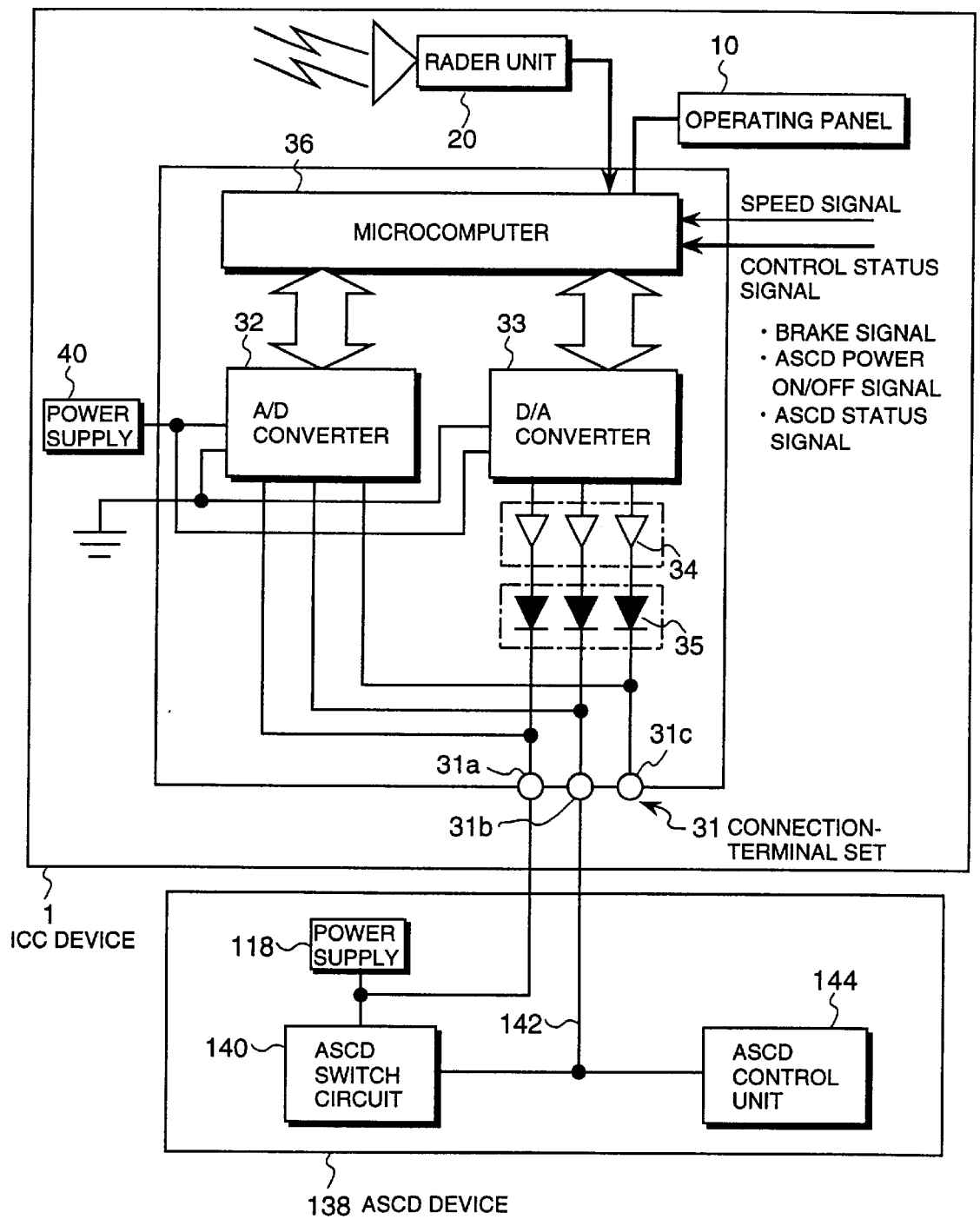
FIG. 10 is a diagram showing a system in which the ICC device implemented by the first embodiment of the present invention is used in conjunction with an ASCD device shown in FIG. 25.

FIG. 10 is a diagram showing a system in which the ICC device 1 implemented by the present embodiment is used in conjunction with an ASCD device 138 shown in FIG. 25.

As shown in FIG. 10, a signal line 142 of an ASCD switch circuit 140 through which the operating signals are transmitted are connected to the connection terminals 31b of the connection-terminal set 31. In this case, information on the states of implementation of the acceleration, deceleration and cancel signals is stored in the storage unit 362 as follows.

Acceleration Signal:
Connection terminal for inputting the signal: Connection terminal 31*b*
Voltage level of the signal: A voltage obtained by dividing the voltage of the power supply 118 by a potentiometer with a predetermined resistance ratio.
Deceleration Signal:
Connection terminal for inputting the signal: Connection terminal 31*b*
Voltage level of the signal: A voltage obtained by dividing the voltage of the power supply 118 by a potentiometer with a predetermined resistance ratio different from that for the acceleration signal.
Cancel Signal:
Connection terminals for inputting the signal: Connection terminals 31*b* and 31*c*
Voltage level of the signal: A voltage obtained by dividing the voltage of the power supply 118 by a potentiometer with a predetermined resistance ratio different from those for the acceleration and deceleration signals.

As described above, in the present embodiment, information for identifying the operating signals of the ASCD device, that is, the acceleration, deceleration and cancel signals, is stored in the storage unit 362 in a tuning process. Thus, according to the present embodiment, the operating signals can be generated by the ICC device 1 by referring to the information for identifying the operating signals stored in the storage unit 362, allowing follow-up cruise control to be carried out in conjunction with the existing ASCD device without regard to the states of implementation of the operating signals for the ASCD device.

Next, processing for carrying out the follow-up cruise control is explained.

Figure 11:
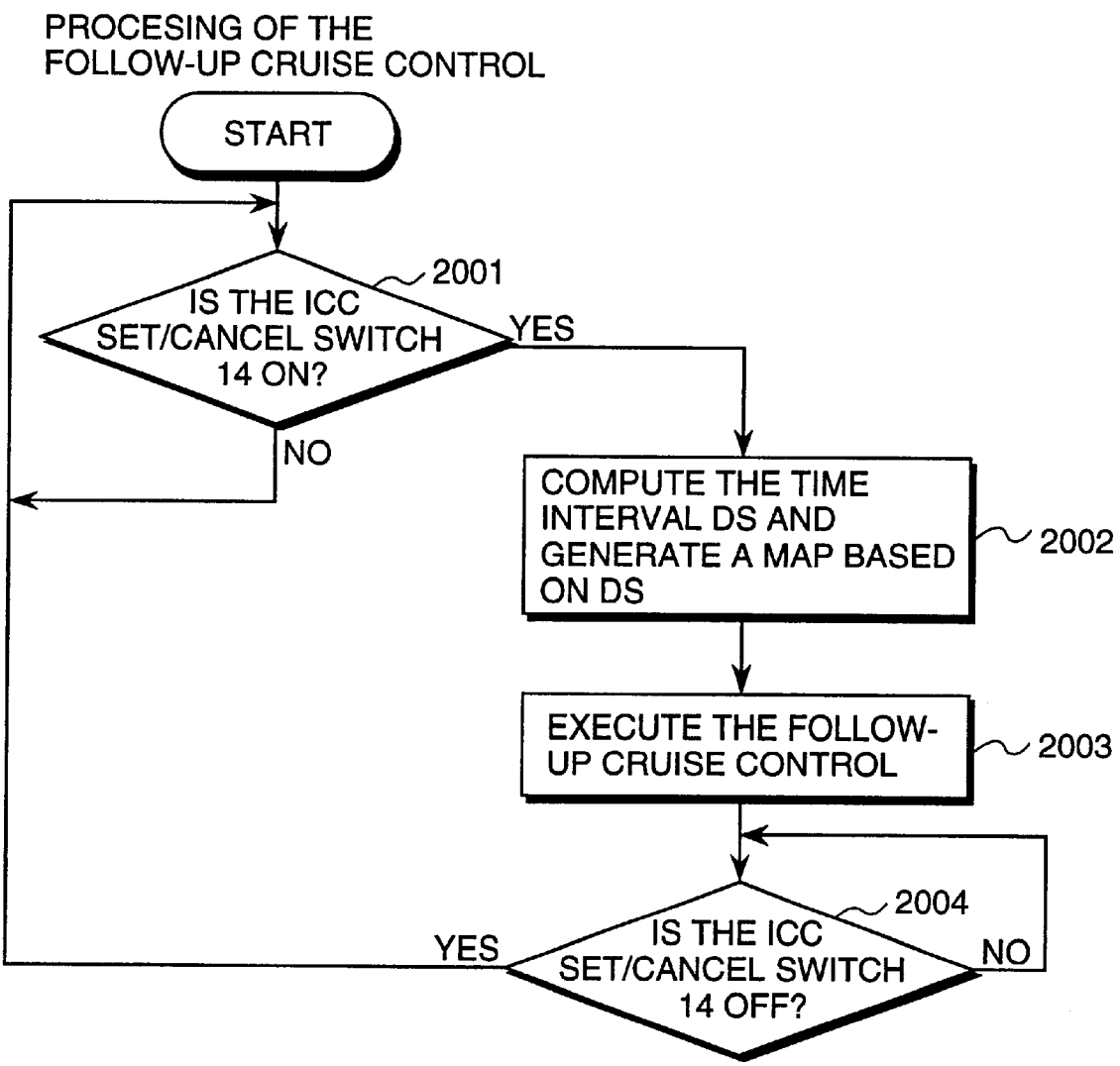
FIG. 11 is a flowchart used for explaining a procedure for starting follow-up cruise control based on the first embodiment of the present invention.
Figure 12:
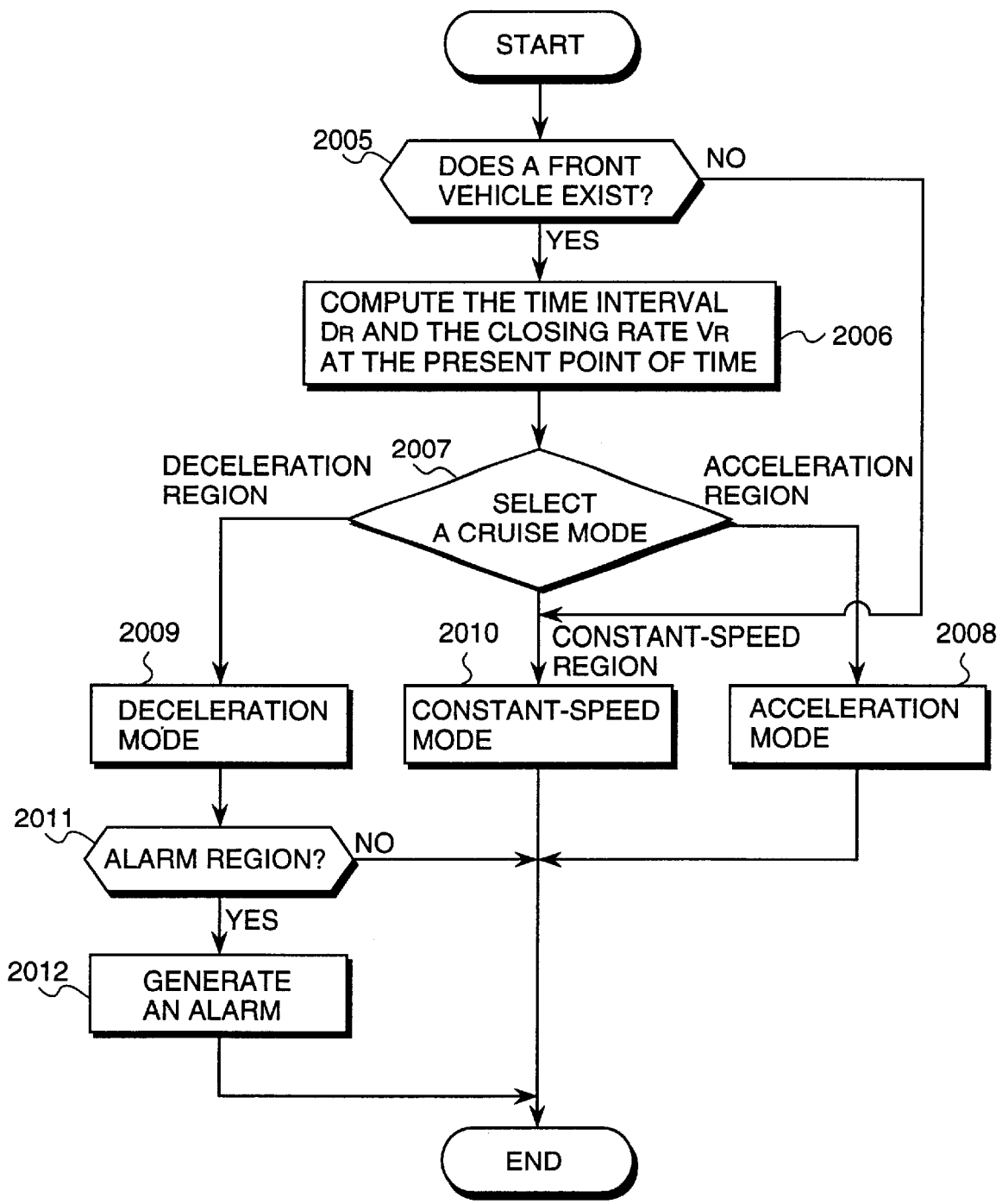
FIG. 12 is a flowchart used for explaining processing carried out in the follow-up cruise control based on the first embodiment of the present invention.

FIG. 11 is a flowchart used for explaining a procedure for starting the follow-up cruise control based on the first embodiment of the present invention and FIG. 12 is a flowchart used for explaining processing carried out in the follow-up cruise control based on the first embodiment.

The flowchart shown in FIG. 11 begins with a step 2001 at which the control unit 364 employed in the microcomputer 36 forms a judgment as to whether or not the ICC set/cancel switch 14 of the operating panel 10 has been turned on by checking a signal received by the receiving/transmitting unit 361 from the operating panel 10. If the ICC set/cancel switch 14 has not been pressed yet, the flow returns to the step 2001 to repeat the processing, waiting for the ICC set/cancel switch 14 to be pressed. If the ICC set/cancel switch 14 has been pressed, on the other hand, the flow proceeds to a step 2002 at which the operation determining unit 363 computes the time interval $D_s$ at the point in time when the ICC set/cancel switch 14 is turned on from the speed signal generated by the speed sensor 42 and the signal generated by the radar unit 20 to represent the range between the host and front vehicles. A map based on the computed time interval $D_s$ like the one shown in FIG. 6 is created and stored in the map sub-unit 363*b*. Then, the flow goes on to a step 2003 to execute the follow-up cruise control in accordance with a flowchart shown in FIG. 12. The flow then proceeds to a step 2004 at which the control unit 364 forms a judgment as to whether or not the ICC set/cancel switch 14 has been turned off. If the ICC set/cancel switch 14 has been turned off, the flow returns to the step 2001 to repeat the processing, waiting for the ICC set/cancel switch 14 to be turned on again. If the ICC set/cancel switch 14 has not been turned off yet, on the other hand, the flow returns to the step 2003 to again execute the follow-up cruise control in accordance with a flowchart shown in FIG. 12.

Next, the follow-up cruise control is explained by referring to the flowchart shown in FIG. 12. As shown in the figure, the flowchart begins with a step 2005 at which the control unit 364 employed in the microcomputer 36 forms a judgment as to whether or not a front vehicle exists within a predetermined range based on the signal generated by the radar unit 20 to represent the range between the host and front vehicles. The judgment considers a case in which a front vehicle to be followed up disappears due to a turn to the right or other reasons. If such a front vehicle exists, the flow of control goes on to a step 2006. If such a front vehicle does not exist, on the other hand, the flow of control goes on to a step 2010 at which a constant-speed mode is selected to take a constant-speed cruise at a speed at the present time.

At the step 2006, the computing sub-unit 363a employed in the operation judging unit 363 computes the time interval $D_r$ and the closing rate $V_r$ at the present point of time from the speed signal generated by the speed sensor 42 and the signal generated by the radar unit 20 to represent the range between the host and front vehicles. Then, the flow of control proceeds to a step 2007 at which the operation-type selecting sub-unit 363c employed in the operation determining unit 363 plots a point representing the time interval Dr and the closing rate $V_r$ computed at the step 2006 on the map stored in the map sub-unit 363b in order to select a cruise mode by identification of a region on the map on which the point is plotted. If the point is plotted on the acceleration region, the flow of control continues to a step 2008 to enter an acceleration mode. If the point is plotted on the deceleration region, the flow of control continues to a step 2009 to enter a deceleration mode. If the point is plotted on the constant-speed region, the flow of control continues to a step 2010 to enter a the constant-speed mode cited before.

In the acceleration mode, that is, at the step 2008, the control unit 364 reads out the information for identifying the acceleration signal from the storage unit 362, outputting a predetermined signal with a voltage level conforming to the information to the receiving/transmitting unit 361. The receiving/transmitting unit 361 is requested to forward the predetermined signal to the connection terminal 31a, 31b or 31c of the connection-terminal set 31 as an acceleration signal. Receiving this acceleration signal, the ASCD device 5 connected to the ICC device 1 controls the throttle valve 43 so as to accelerate the host vehicle.

In the deceleration mode, that is, at the step 2009, the control unit 364 reads out the information for identifying the deceleration signal from the storage unit 362, outputting a predetermined signal with a voltage level conforming to the information to the receiving/transmitting unit 361. The receiving/transmitting unit 361 is requested to forward the predetermined signal to the connection terminal 31a, 31b or 31c of the connection-terminal set 31 as a deceleration signal. Receiving this deceleration signal, the ASCD device 5 connected to the ICC device 1 controls the throttle valve 43 so as to decelerate the host vehicle. The flow of control then goes on to a step 2011 at which the operation determining unit 363 forms a judgment as to whether or not the point plotted on the map at the step 2007 pertains to an alarm region of the map. If the point pertains to the alarm region of the map, the flow of control proceeds to a step 2012 at which the operation determining unit 363 requests the control unit 364 to output an alarm. At this request, the control unit 364 issues a command to the operating panel 10 to generate an alarm sound through the speaker 12.

In the constant-speed mode, that is, at the step 2010, the control unit 364 requests the ASCD device 5 connected to the ICC device 1 to stop processing of signals such as the acceleration or deceleration signal in case the ICC device 1 is outputting this signal thereto. At the request made by the control unit 364, the ASCD device 5 carries out auto cruise control so that the host vehicle is running at a speed at the point in time when the supplying of the acceleration or deceleration signal is halted.

As described above, in the present embodiment, the type of a required operation is determined by plotting a point representing the time interval $D_r$ between the host and front vehicles and the closing rate $V_r$ of the host vehicle with respect to the front vehicle at the present point in time on a map showing relations among the time interval, the closing rate and the types of operation such as acceleration and deceleration. As a result, according to the present embodiment, the type of an operation required to maintain a range between the host and front vehicles that is appropriate for the speed can be determined in a short period of time.

In comparison with the conventional ICC device wherein the type of an operation required to maintain a range between the host and front vehicles that is appropriate for the speed is determined by plotting a point representing the time interval $D_r$ between the host and front vehicles and the closing rate $V_r$ of the host vehicle with respect to the front vehicle at the present point of time on a map showing relations among the speed, the range between the host and front vehicles, the closing rate and the types of the operation such as acceleration and deceleration, the ICC device implemented by the present embodiment allows the type of a required operation to be determined by using a simple map.

The following is description of processing to resume the follow-up cruise control which was temporarily suspended.

Figure 13:
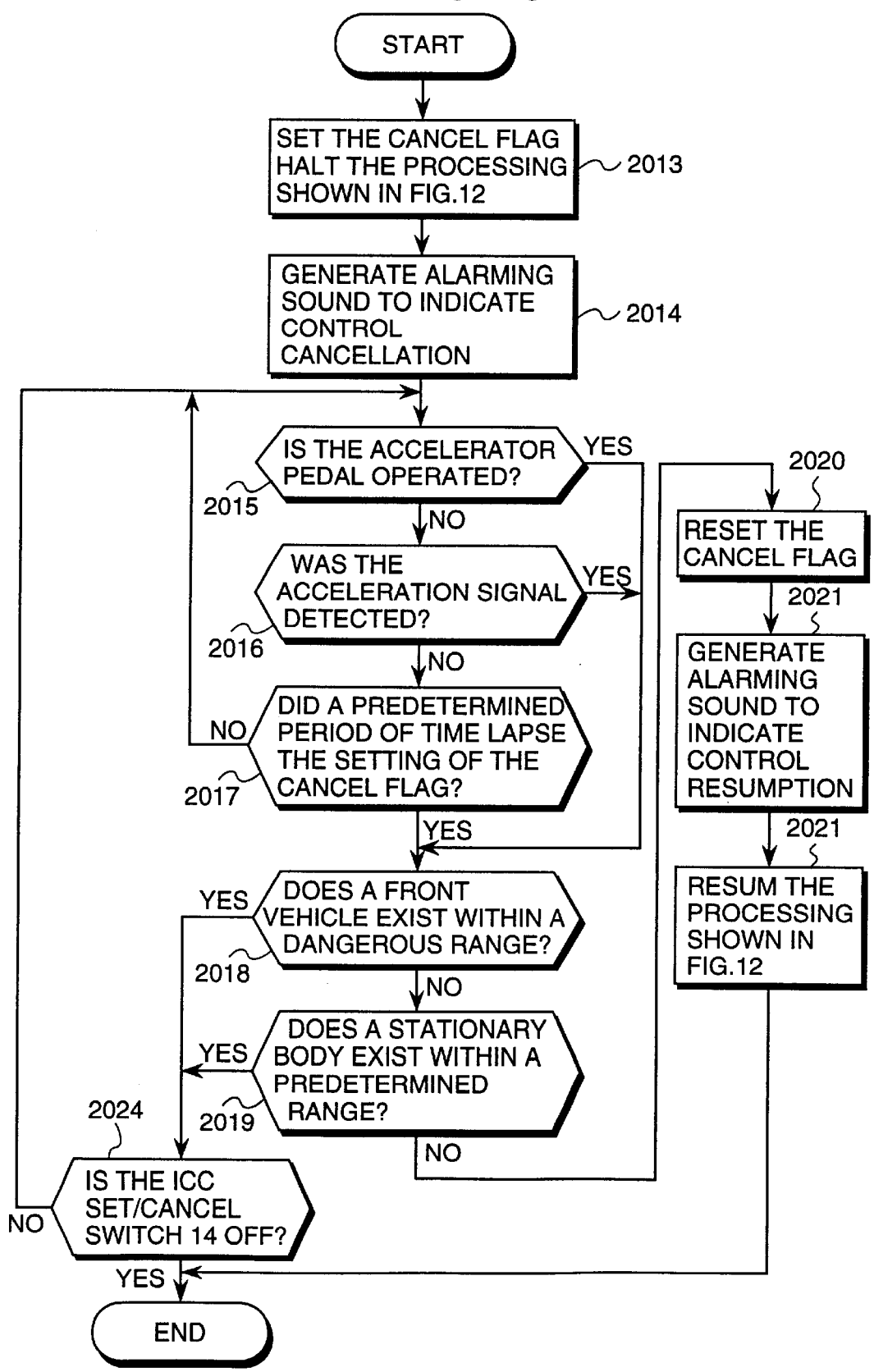
FIG. 13 is a flowchart used for explaining processing carried out to resume the follow-up cruise control based on the first embodiment of the present invention after its temporary suspension.

As described above, the ASCD control unit 52 employed in the ASCD device 5 suspends the auto cruise control when the cancel signal of the ASCD switch circuit 57 or the brake signal generated by the brake detecting sensor 49 is detected. In order to resume the auto cruise control which was once suspended, it is necessary for the driver to press the resume-acceleration switch 57a of the ASCD switch circuit 57. In addition, the ICC device 1 implemented by the present embodiment also temporarily suspends the follow-up cruise control by halting the operation to output an operating signal when the cancel signal of the ASCD switch circuit 57 or the brake signal generated by the brake detecting sensor 49 is detected. It is thus feared that the automatic follow-up cruise control can not be carried out on a road where the brake is operated frequently such as a road with heavy traffic. In order to solve this problem, with the ICC device 1 implemented by the present embodiment, the follow-up cruise control which was temporarily suspended is resumed under a certain condition. FIG. 13 is a flowchart used for explaining processing carried out to resume the follow-up cruise control based on the first embodiment of the present invention after its temporary suspension. As shown in the figure, the flowchart begins by temporarily suspending the follow-up cruise control shown in FIG. 12 when the cancel signal of the ASCD switch circuit 57 or the brake signal generated by the brake detecting sensor 49 is detected while the processing of the follow-up cruise control is being carried out.

To be more specific, the flowchart shown in FIG. 13 starts with a step 2013 at which the control-resumption judging unit 365 employed in the microcomputer 36 sets a cancel flag and, after that, temporarily halts the execution of the flowchart shown in FIG. 12. The flow of processing then goes on to a step 2014 at which the control-resumption judging unit 365 issues a command to the operating panel 10 to generate alarming sound through the speaker 12, indicating that the control by the ICC device 1 is temporarily suspended.

Then, the flow of processing proceeds to a step 2015 at which the control-resumption judging unit 365 forms a judgment as to whether or not the driver has stepped on the accelerator pedal 47 by typically checking a signal generated by a throttle valve opening sensor. If the driver has stepped on the accelerator pedal 47, the control-resumption judging unit 365 judges that the driver wants to resume the follow-up cruise control based on the ICC device 1. In this case, the flow of processing goes on to a step 2018 in order to resume the follow-up cruise control under a predetermined condition. If the driver has not stepped on the accelerator pedal 47, on the other hand, the flow of processing continues to a step 2016.

At the step 2016, the control-resumption judging unit 365 forms a judgment as to whether or not an acceleration signal from the ASCD switch circuit 57 has been detected. If an acceleration signal from the ASCD switch circuit 57 has been detected, the control-resumption judging unit 365 judges that the driver has pressed the resume-acceleration switch 57a, desiring that the follow-up cruise control by the ICC device 1 be resumed. In this case, the flow of processing goes on to the step 2018 in order to resume the follow-up cruise control under the predetermined condition. If an acceleration signal from the ASCD switch circuit 57 has not been detected, on the other hand, the flow of processing proceeds to a step 2017.

At the step 2017, the control-resumption judging unit 365 forms a judgment as to whether or not a predetermined period of time has lapsed since the setting of the cancel flag at the step 2013. If the predetermined period of time has not lapsed since the setting of the cancel flag, the flow of processing proceeds to a step 2015 to repeat the processing. With the predetermined period of time having lapsed since the setting of the cancel flag, on the other hand, the flow of processing goes on to the step 2018 in order to resume the follow-up cruise control under the predetermined condition even if the driver has not carried out an operation to resume the follow-up cruise control by the ICC device 1, that is, even if the driver has not stepped on the accelerator pedal 47 or operated the resume-accelerator switch 57b.

At the step 2018, the control-resumption judging unit 365 forms a judgment as to whether or not a front vehicle exists within a dangerous range based on a signal generated by the radar unit 20 to represent the present range between the host and front vehicles. The dangerous range is a range set in advance in accordance with the speed. If a front vehicle exists within the dangerous range, the follow-up cruise control by the ICC device 1 should not be resumed. In this case, the flow of processing goes on to a step 2024 to form a judgment as to whether or not the ICC set/cancel switch 14 has been turned off. If the ICC set/cancel switch 14 has not been turned off, the flow of processing returns to the step 2015 to repeat the processing.

If the ICC set/cancel switch 14 has been turned off, on the other hand, the processing is terminated with the follow-up cruise control by the ICC device 1 remaining suspended as it is. If no front vehicle is found present within the dangerous range at the step 2018, on the other hand, the flow of processing continues to a step 2019.

At the step 2019, the control-resumption judging unit 365 forms a judgment as to whether or not a stationary body exists within a predetermined range based on a signal generated by the radar unit 20. If a stationary body exists within the predetermined range, the follow-up cruise control by the ICC device 1 should not be resumed. In this case, the flow of processing goes on to a step 2024 to form a judgment as to whether or not the ICC set/cancel switch 14 has been turned off. If the ICC set/cancel switch 14 has not been turned off, the flow of processing returns to the step 2015 to repeat the processing.

If the ICC set/cancel switch 14 has been turned off, on the other hand, the processing is terminated with the follow-up cruise control by the ICC device 1 remaining suspended as it is. If no stationary body is found present within the predetermined range at the step 2019, on the other hand, the flow of processing continues to a step 2020.

At the step 2020, the control-resumption judging unit 365 resets the cancel flag which was set at the step 2013. Then the flow of processing goes on to a step 2021 at which the control-resumption judging unit 365 issues a command to the operating panel 10 to generate alarm sound through the speaker 12, indicating that the follow-up cruise control by the ICC device 1 which was temporarily suspended will be resumed. The flow of processing then proceeds to a step 2022 to return to the processing shown in FIG. 12.

As described above, in the present embodiment, as a predetermined period of time lapses since the temporary suspension of the follow-up cruise control shown in FIG. 12 upon detection of the cancel signal of the ASCD switch circuit 57 or the brake signal generated by the brake detecting sensor 49, the follow-up cruise control is resumed under the predetermined condition even if the driver has not carried out a predetermined operation to resume the follow-up cruise control by the ICC device 1, that is, even if the driver has not stepped on the accelerator pedal 47 or operated the resume-accelerator switch 57b. As a result, according to the present embodiment, the automatic follow-up cruise control can be carried out with a high degree of efficiency on a road where the brake is operated frequently such as a road with heavy traffic.

Next, a second embodiment of the present invention is explained as follows.

Figure 14:
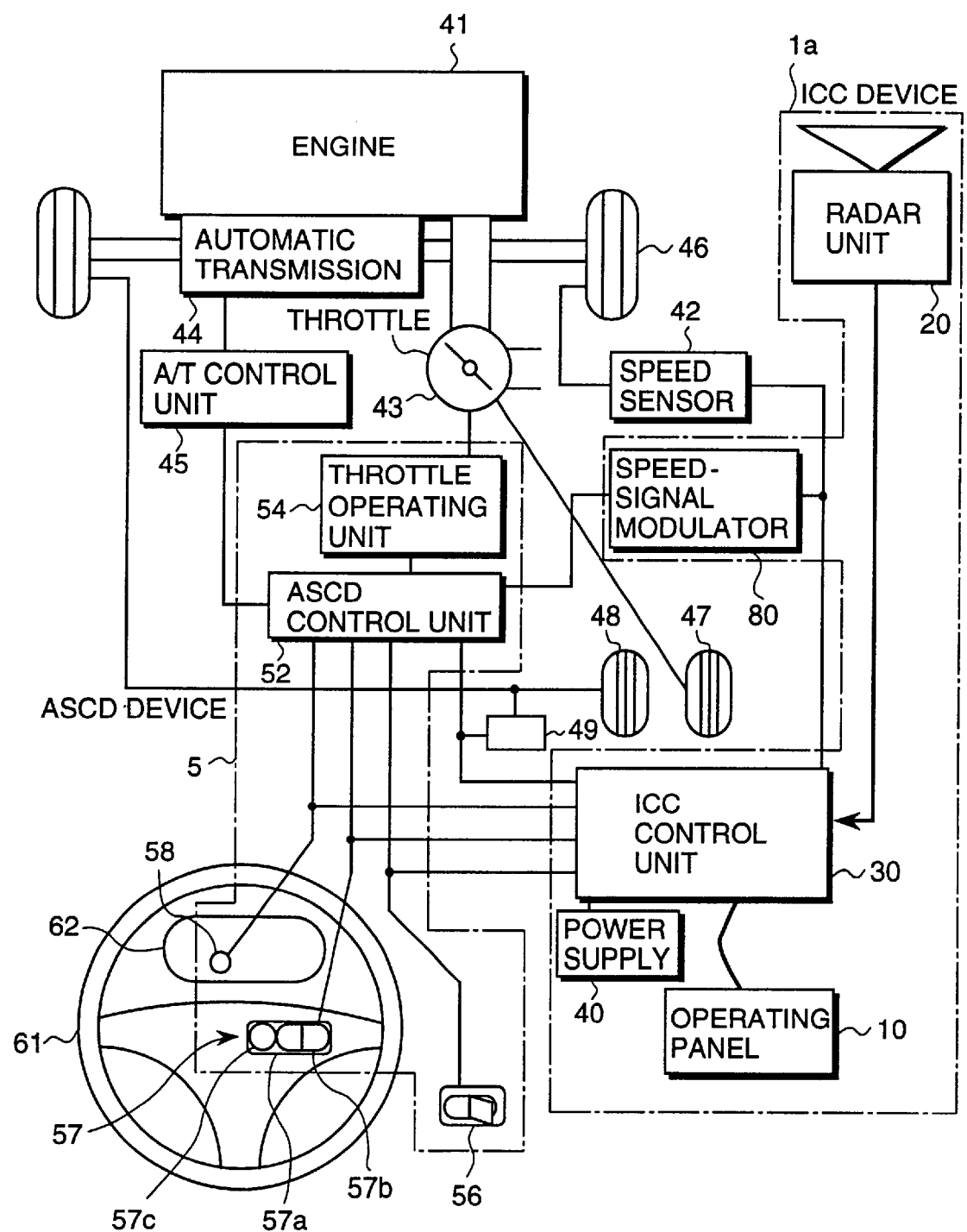
FIG. 14 is a schematic diagram showing the configuration of a vehicle system for implementing an automatic follow-up cruise by means of an ICC device implemented by a second embodiment of the present invention.
Figure 15:
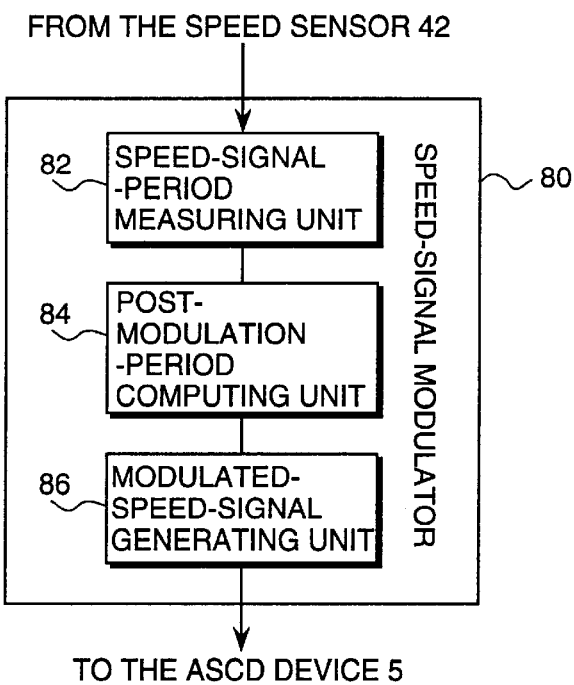
FIG. 15 is a functional block diagram showing the configuration of a speed-signal modulator employed in the ICC device shown in FIG. 14.

FIG. 14 is a skeleton diagram showing the configuration of a vehicle system for implementing an automatic follow-up cruise by means of an ICC device 1a implemented by the second embodiment and FIG. 15 is a functional block diagram showing the configuration of a speed-signal modulator 80 employed in the ICC device 1a shown in FIG. 14. It should be noted that components of FIG. 14 identical with those shown in FIG. 2 are denoted by the same reference numerals used for denoting the latter and their description is omitted.

The ICC device 1a implemented by the second embodiment is different from the ICC device 1 provided by the first embodiment in that the former employs the speedsignal modulator 80 for modulating the frequency of the speed signal generated by the speed sensor 42 and supplying the modulated signal to the ASCD control unit 52 employed in the ASCD device 5. The rest of the configuration of the ICC device 1a is the same as the ICC device 1 implemented by the first embodiment.

The speed-signal modulator 80 is provided in order to extend the range of the speed subjected to the auto cruise control by the ASCD device 5. As described in the explanation of the conventional technology, most of the ASCD devices detect the speed by monitoring a speed signal generated by a speed sensor with a frequency proportional to the speed and carries out auto cruise control in the speed range 40 km/h to 100 km/h which is set in advance. For this reason, with a retrofit-type ICC device for carrying out follow-up cruise control by making use of the functions of an ASCD device already installed in the host vehicle, the follow-up cruise control can be performed only for the speed range set in advance in the existing ASCD device. In order to solve this problem, the second embodiment employs the speed-signal modulator 80 for modulating the frequency of the speed signal generated by the speed sensor 42 and supplying the modulated signal to the ASCD control unit 52 employed in the ASCD device 5. In this way, it is possible to let the ASCD device 5 make a judgment on a speed outside the speed range set in advance in the ASCD device 5 as if the host vehicle were running at a speed in the speed range.

As shown in FIG. 15, the speed-signal modulator 80 comprises a speed-signal-period measuring unit 82 for measuring the period of the speed signal, a post-modulation-period computing unit 84 for computing a post-modulation period of the speed signal from the period of the speed signal measured by the speed-signal-period measuring unit 82 and a modulated-speed-signal generating unit 86 for generating a modulated speed signal with a period computed by the post-modulation-period computing unit 84 and supplying the modulated speed signal to the ASCD control unit 52 employed in the ASCD device 5. Typically, the speed-signal modulator 80 is implemented by a microcomputer.

The post-modulation-period computing unit 84 computes a post-modulation period T1 of the speed signal by using the following equation:

$$T_1 = C/(((C/T_2) - \alpha)X(\gamma - \beta)/(\delta - \alpha) + \beta) \quad (1)$$

where: $\alpha$ is the lower limit of a speed range of control by the ICC device 1a, $\delta$ is the upper limit of the speed range of control by the ICC device 1a, $\beta$ is the lower limit of a speed range that can be set in the ASCD device 5, $\gamma$ is the upper limit of the speed range that can be set in the ASCD device 5, $T_2$ is the period of the speed signal measured by the speed-signal-period measuring unit 82 and C is a coefficient determined for the speed sensor 42 by an equation $C = V \times T_2$ with the speed V expressed in terms of (Km/h).

Assume that the speed range set in the ASCD device 5, that is, the speed range of the auto cruise control, is from 40 km/h to 120 km/h. In this case, in order to implement auto cruise control at a speed of 10 km/h, the period of the speed signal generated by the speed sensor 42 is reduced by a factor equal to or smaller than ¼. In this way, a speed signal actually representing a speed of 10 km/h is supplied to the ASCD device 5 as if the speed were equal to or higher than 40 km/h in order to let the ASCD device 5 judge a cruise as if the host vehicle were running at a speed equal to or higher than 40 km/h. It should be noted that, with a period-reduction factor equal to or smaller than ¼, a speed of 30 km/h will be represented by a speed signal which is seen by the ASCD device 5 as a speed signal for a speed equal to or higher than 120 km/h. As a result, when a speed signal actually representing a speed equal to or higher than 30 km/h is supplied to the ASCD device 5, the auto cruise control can no longer be implemented. For this reason, at a speed of 30 km/h, the period-reduction factor needs to be increased and, for speeds in the speed range 40 km/h to 120 km/h, the speed signal generated by the speed sensor 42 is supplied to the ASCD device 5 as it is with no modulation so that the ASCD device 5 always sees a speed signal supplied thereto with a period which results as if the host vehicle were running at a speed in the speed range 40 km/h to 120 km/h. That is to say, in order to allow the follow-up cruise control to be carried out in any speed range, it is necessary to modulate the speed signal with a degree of modulation adapted to the speed. With the speed-signal modulator 80, by modulating the speed signal generated by the speed sensor 42 in accordance with Eq. (1), the follow-up cruise control can be carried out in any speed range.

Figure 16:
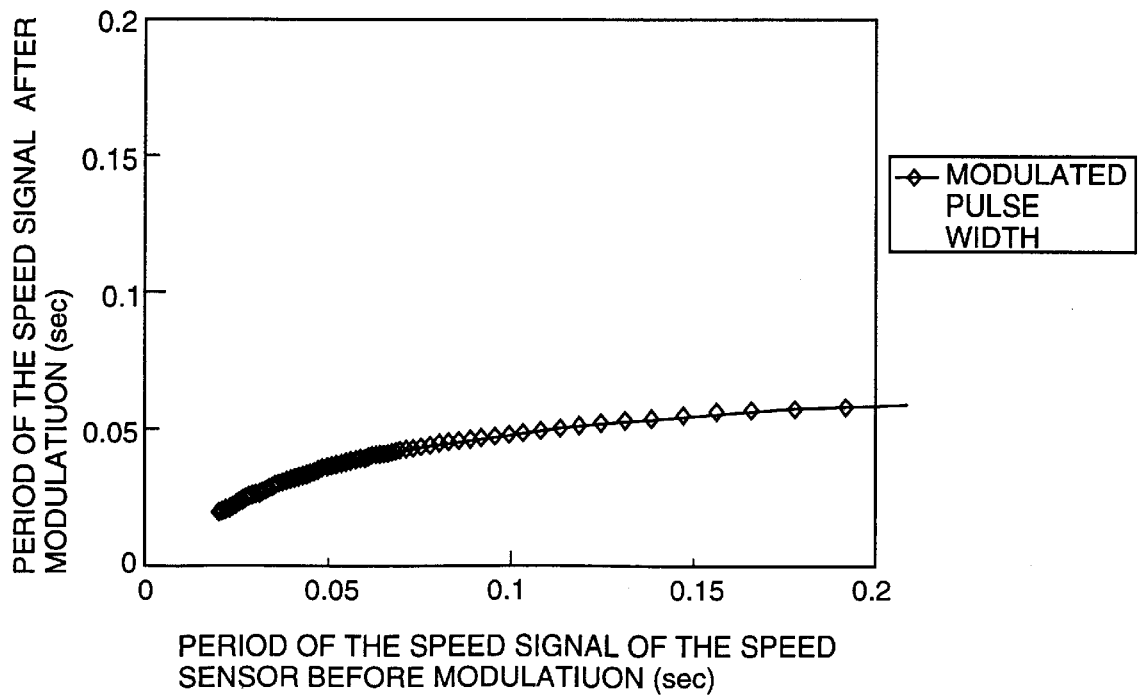
FIG. 16 is a graph showing an example of a relation between the period of a speed signal output by a speed sensor and the period of a speed signal resulting from modulation carried out by the speed-signal modulator.

Assume that C=2.5, $\alpha$=10 km/h, $\beta$=40 km/h, $\gamma$=120 km/h and $\delta$=120 km/h are used in Eq. (1). In this case, a relation between the period of the speed signal generated by the speed sensor 42 and the period of the speed signal resulting from the modulation carried out by the speed-signal modulator 80 is shown in FIG. 16. That is to say, as indicated by the relation shown in FIG. 16, by modulating the speed signal, automatic follow-up control can be carried out for the speed range 10 km/h to 120 km/h by means of the ASCD device 5 with the speed range 40 km/h to 120 km/h set therein. It should be noted that the post-modulation-period computing unit 84 can also compute a period after modulation by using a map like the one shown in FIG. 16 in place of Eq. (1).

Next, a third embodiment of the present invention is explained as follows.

FIG. 17 is a functional block diagram showing a microcomputer employed in an ICC control unit of an ICC device implemented by the third embodiment and FIG. 18 is a diagram used for explaining a control method of acceleration adopted by the third embodiment.

The ICC device implemented by the third embodiment is different from the ICC device 1 provided by the first embodiment in that the ICC control unit of the former employs a microcomputer 36a shown in FIG. 17 in place of the microcomputer 36 shown in FIG. 5. The rest of the configuration of the ICC device provided by the third embodiment is the same as the ICC device 1 implemented by the first embodiment and its explanation is therefore omitted.

The microcomputer 36a shown in FIG. 17 is different from the microcomputer 36 shown in FIG. 5 in that the former employs a duty-cycle determining unit 367 and a control unit 364a replacing the control unit 364. The rest of the configuration is the same as the microcomputer 36 shown in FIG. 5.

Figure 18A:
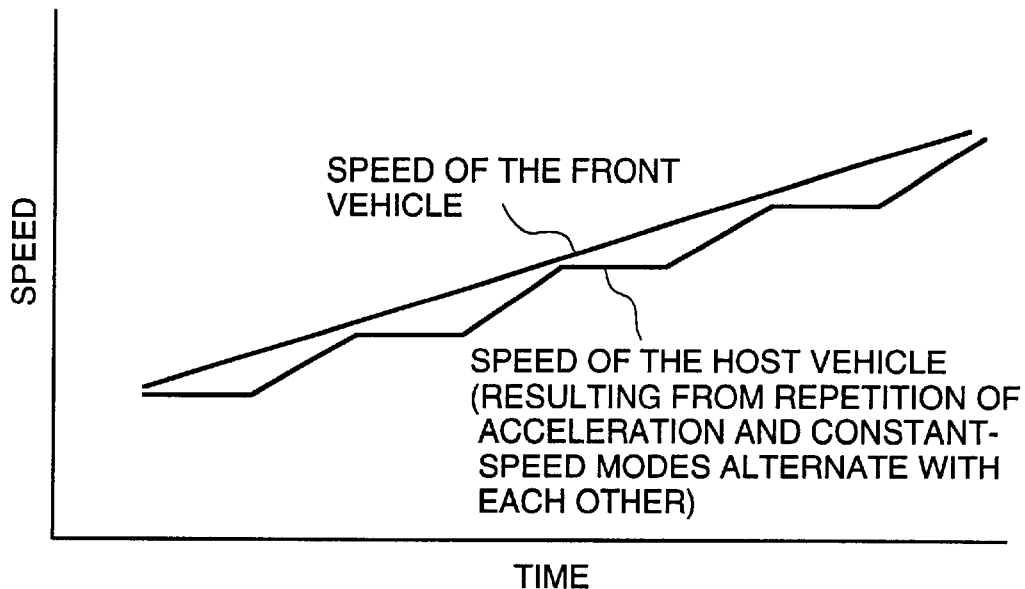
FIG. 18 is a diagram used for explaining a control method of acceleration adopted by the third embodiment of the present invention.
Figure 18B:
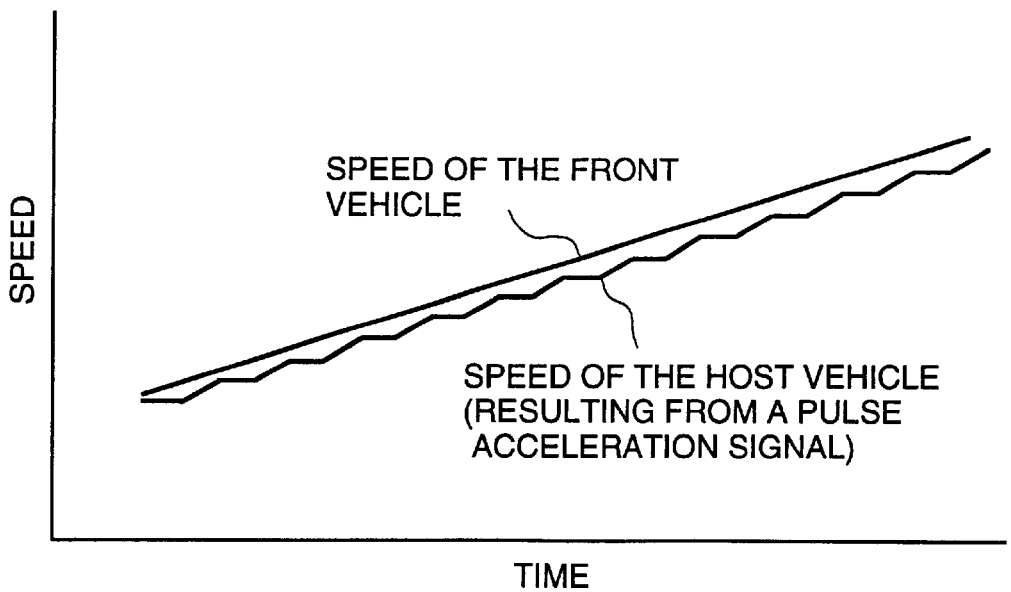

When an operation with the type thereof determined by the operation determining unit 363, that is either acceleration or deceleration, is carried out, the duty-cycle determining unit 367 determines the duty cycle of the acceleration or deceleration signal which is output at a predetermined period so as to result in an appropriate acceleration or deceleration. While the acceleration signal is being supplied to the ASCD control unit 52, in the ASCD device 5, the throttle valve operating unit 54 opens the throttle valve to a certain degree of opening. Thus, the acceleration resulting from acceleration carried out by the ASCD device 5 is determined by the degree of opening to which the throttle valve is opened by the throttle valve operating unit 54 and can not be adjusted by the driver. That is to say, during acceleration carried out by the ASCD device 5, only a fixed type of acceleration can be obtained. Thus, when a front vehicle is running at an acceleration lower than the fixed-type acceleration cited above, with a retrofit-type ICC device for carrying out follow-up cruise control by making use of the functions of an ASCD device already installed in a host vehicle, the speed of the host vehicle is adjusted in order to follow up the front vehicle at the same average speed as the front vehicle. As a result, accelerated and constant-speed cruises are repeated alternately as shown in FIG. 18A. The repetition of the accelerated and constant-speed cruises alternate with each other induces vibration at a low frequency which in turn provides an uncomfortable feeling to the driver. In order to solve this problem, in the present embodiment, by shortening the on/off period of the acceleration/deceleration signal to a value small enough for providing no discomfort feeling to the driver and, at the same time, adjusting the duty cycle of the acceleration/deceleration signal to match the acceleration of the front vehicle as shown in FIG. 18B, an appropriate acceleration or deceleration can be obtained.

As shown in FIG. 17, the duty-cycle determining unit 367 comprises a computing sub-unit 367a, a map sub-unit 367b and a duty-cycle selecting sub-unit 367c. The computing sub-unit 367a computes the accelerations/decelerations of the host and front vehicles from the speed signal generated by the speed sensor 42 and the signal generated by the radar unit 20 to represent the range between the host and front vehicles. It should be noted that the acceleration/deceleration of the host vehicle can be found by differentiating the speed of the host vehicle with respect to time. As for the acceleration/deceleration of the front vehicle, first of all, the speed of the front vehicle is found by adding the closing rate of the host vehicle with respect to the front vehicle to the speed of the host vehicle. The closing rate of the host vehicle with respect to the front vehicle found by the computing sub-unit 363*a* of the operation determining unit 363 can be used.

Figure 21A:
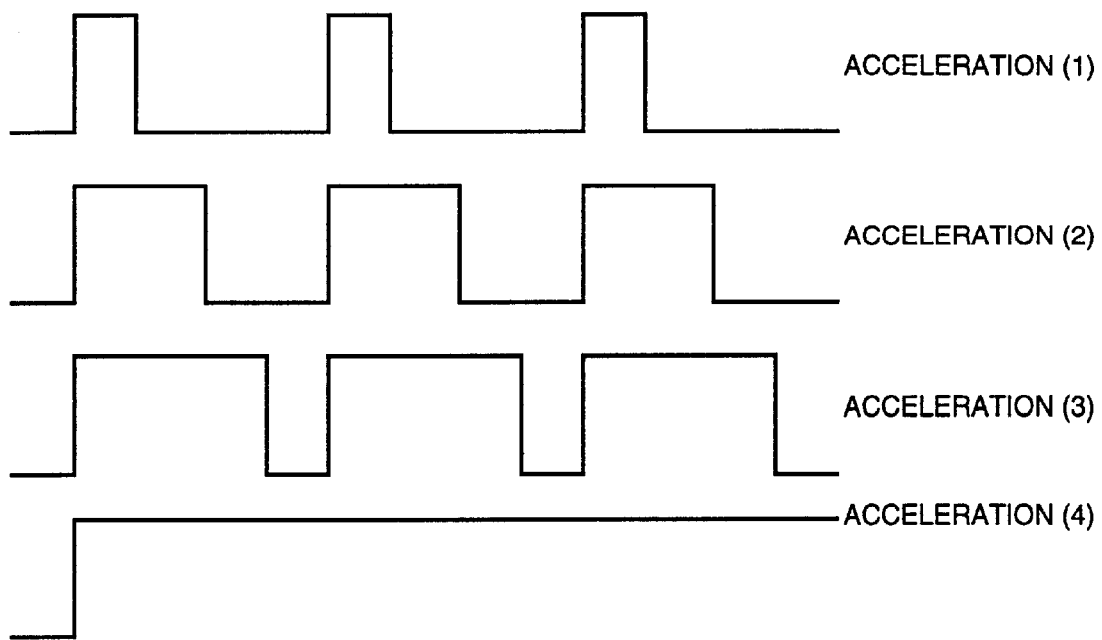
FIG. 21 is diagrams used for explaining a relation between the acceleration and the duty cycle of the acceleration signal.
Figure 21B:
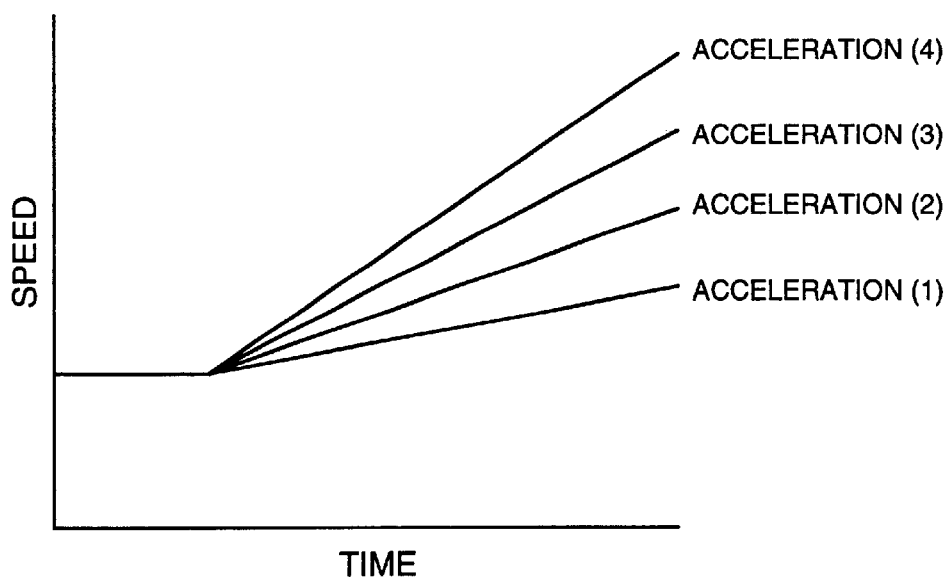

In the map sub-unit 367*b,* a map representing a relation between the acceleration/deceleration and duties of acceleration and deceleration signals generated at a predetermined period like one shown in FIG. 19 is stored. The relation is determined from quantities such as the degree of throttle valve opening, the weight of the vehicle and the power of the engine. The following is a description of the relation between the acceleration/deceleration and the duties of acceleration and deceleration signals generated at a predetermined period. First of all, the relation between the duty cycle of the acceleration signal and the acceleration is described. FIG. 21*a* and *b* are diagrams used for explaining a relation between the acceleration and the duty cycle of the acceleration signal. It should be noted that accelerations (1) to (4) of the host vehicle shown in FIG. 21B respectively result from control by supplying acceleration signals (1) to (4) shown in FIG. 21A to the ASCD device 5.

In the case of the acceleration signal (4) which is supplied continuously to the ASCD device 5, the host vehicle is being accelerated at the high acceleration (4). In the cases of the acceleration signals (1) to (3) which are each supplied as a pulse signal with a fixed period, on the other hand, the host vehicle is being accelerated respectively at an acceleration (1, (2) or (3) lower than the acceleration (4). In addition, by changing the duty cycle of the acceleration signal as is the cases of the acceleration signals (1) to (3), the opening duration of the throttle valve can be changed, allowing the magnitude of the acceleration to be modified.

Figure 22A:
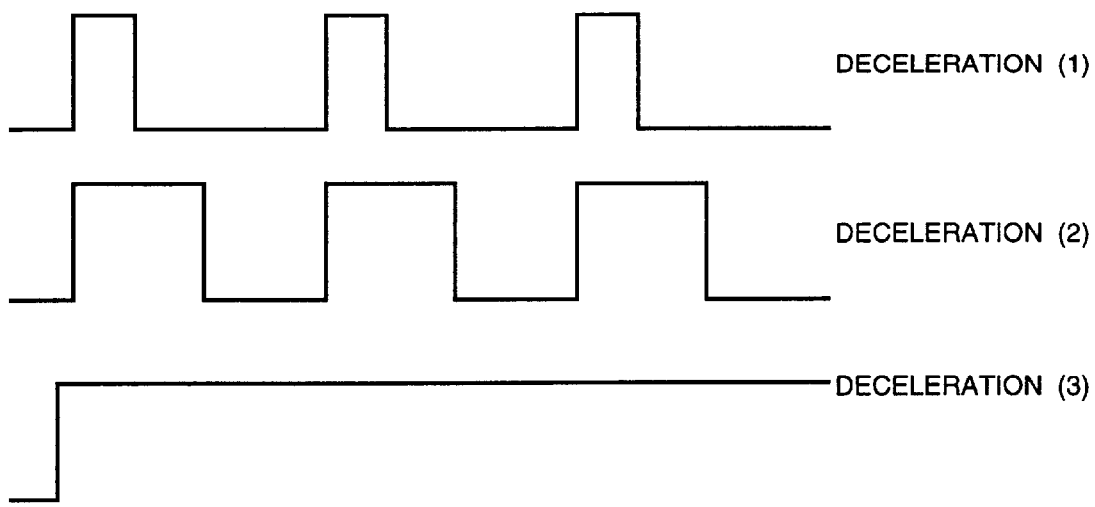
FIG. 22 is diagrams used for explaining a relation between the deceleration and the duty cycle of the deceleration signal.
Figure 22B:
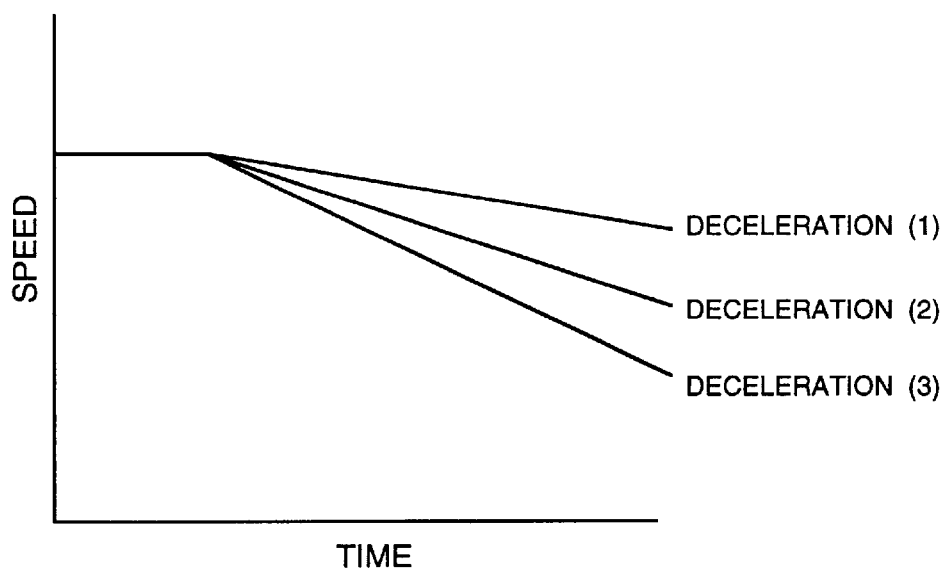

The following is description of the relation between the duty cycle of the acceleration signal and negative acceleration which is also referred to hereafter as deceleration. FIG. 22*a* and *b* are diagrams used for explaining a relation between the deceleration and the duty cycle of the deceleration signal. It should be noted that decelerations (1) to (3) of the host vehicle shown in FIG. 22B respectively result from control by supplying deceleration signals (1) to (3) shown in FIG. 22A to the ASCD device 5.

In the case of the deceleration signal (3) which is supplied continuously to the ASCD device 5, the host vehicle is being decelerated at the high deceleration (3). In the cases of the deceleration signals (1) and (2) which are each supplied as a pulse signal with a fixed period, on the other hand, the host vehicle is being decelerated respectively at a deceleration (1) and (2) lower than the deceleration (3). In addition, by changing the duty cycle of the deceleration signal as is the cases of the deceleration signals (1) and (2), the opening duration of the throttle valve can be changed, allowing the magnitude of the deceleration to be modified.

The duty-cycle selecting unit 367*c* selects a duty cycle of the acceleration or deceleration signal generated at a predetermined period from the accelarations and/or decelerations of the host and front vehicles computed by the computing sub-unit 367*a* and the map stored in the map sub-unit 367*b*.

The control unit 364*a* carries out operations to read out information identifying an operating signal corresponding to an operation of the type determined by the operation determining unit 363 from the storage unit 362 and to output the operating signal identified by the information read out from the storage unit 362 at a duty cycle determined by the duty-cycle determining unit 367 and at a predetermined period. The remaining operations are the same as those carried out by the control unit 364 shown in FIG. 5.

The following is a description of processing carried out by the present embodiment to obtain an optimum acceleration/deceleration for following up a front vehicle.

Figure 20:
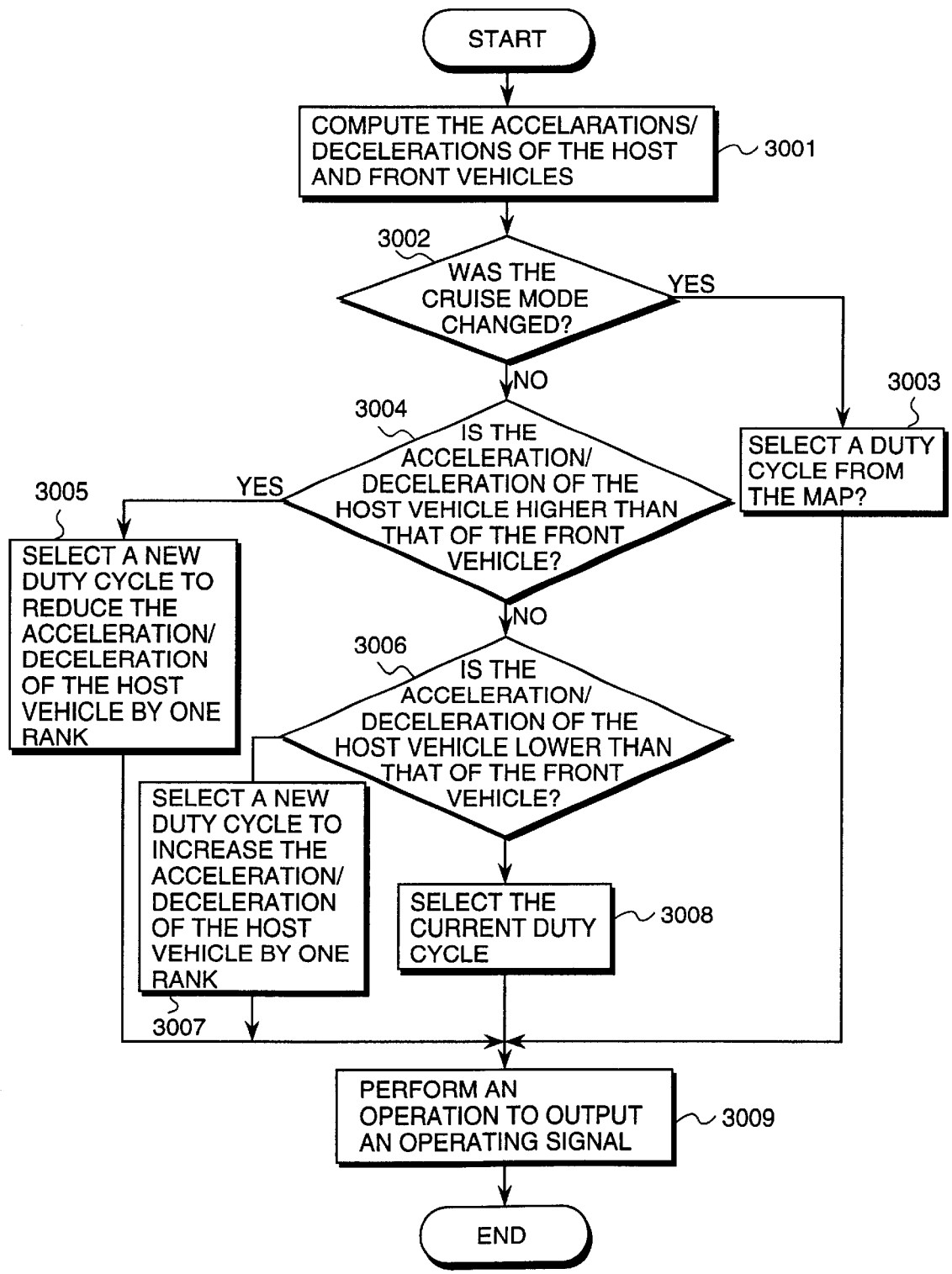
FIG. 20 is a flowchart used for explaining processing carried out in the third embodiment of the present invention for obtaining an optimum acceleration/deceleration to follow up a front vehicle.

FIG. 20 is a flowchart used for explaining processing carried out in the third embodiment of the present invention for obtaining an optimum acceleration/deceleration to follow up a front vehicle. It should be noted that the processing shown in FIG. 20 is carried out at the step 2008 in an acceleration mode or a step 2009 in a deceleration mode of the flowchart shown in FIG. 12.

As shown in FIG. 20, the flowchart begins with a step 3001 at which the computing sub-unit 367*a* of the duty-cycle determining unit 367 computes the accelerations/decelerations of the host and front vehicles from the speed signal generated by the speed sensor 42 and the signal generated by the radar unit 20 to represent the range between the host and front vehicles. Then, the flow of processing goes on to a step 3002 at which the duty-cycle selecting sub-unit 363*c* forms a judgment as to whether or not the cruise mode selected this time at the step 2007 of the flowchart shown in FIG. 12 is the same as the cruise mode selected previously. It should be noted that the processing shown in FIG. 12 is carried out each time the step 2003 of the flowchart shown in FIG. 11 is executed. If the cruise mode selected this time is not the same as the cruise mode selected previously, that is, if the cruise mode selected this time is an acceleration mode while the cruise mode selected previously is a constant-speed mode, for example, the flow of processing proceeds to a step 3003. On the other hand, if the cruise mode selected this time is the same as the cruise mode selected previously, that is, if the cruise mode selected this time and the cruise mode selected previously are both an acceleration mode, for example, the flow of processing proceeds to a step 3004.

At the step 3003, the duty-cycle selecting sub-unit 367*c* selects a duty cycle appropriate for the acceleration/deceleration of the front vehicle computed at the step 3001 from the map stored in the map sub-unit 367*b* and outputs the selected duty cycle to the control unit 364*a*. The flow of processing then continues to a step 3009 at which, receiving the selected duty cycle, the control unit 364*a* carries out operations to read out information identifying an operating signal corresponding to a cruise mode selected at the step 2007 of the flowchart shown in FIG. 12 from the storage unit 362 and to output the operating signal identified by the information read out from the storage unit 362 at the duty cycle selected at the step 3003 and at a predetermined period. It should be noted that the operating signal is an acceleration signal in an acceleration mode or a deceleration signal in a deceleration mode.

At the step 3004, on the other hand, the duty-cycle determining unit 367 forms a judgment as to whether or not the acceleration/deceleration of the host vehicle computed at the step 3001 is higher than the acceleration/deceleration of the front vehicle also computed at the step 3001 by a difference equal to or greater than a predetermined value. If the acceleration/deceleration of the host vehicle is not higher than the acceleration/deceleration of the front vehicle by a difference equal to or greater than the predetermined value, the flow of processing continues to a step 3006. If the acceleration/deceleration of the host vehicle is higher than the acceleration/deceleration of the front vehicle by a difference equal to or greater than the predetermined value, on the other hand, the flow of processing goes on to a step 3005 to set a new duty cycle that decreases the acceleration/deceleration of the host vehicle by one rank so as to allow the host vehicle to follow up the front vehicle at a more appropriate speed and supply the new duty cycle to the controller unit 364*a*. The flow of processing then continues to the step 3009 at which, receiving the newly selected duty cycle, the control unit 364*a* carries out operations to read out information identifying an operating signal corresponding to a cruise mode selected at the step 2007 of the flowchart shown in FIG. 12 from the storage unit 362 and to output the operating signal identified by the information read out from the storage unit 362 at the new duty cycle selected at the step 3005 and at the predetermined period. It should be noted that the operating signal is an acceleration signal in an acceleration mode or a deceleration signal in a deceleration mode.

At the step 3006, the duty-cycle determining unit 367 forms a judgment as to whether or not the acceleration/deceleration of the host vehicle computed at the step 3001 is lower than the acceleration/deceleration of the front vehicle also computed at the step 3001 by a difference equal to or greater than a predetermined value. If the acceleration/deceleration of the host vehicle is lower than the acceleration/deceleration of the front vehicle by a difference equal to or greater than the predetermined value, the flow of processing goes on to a step 3007 at which to set new duty cycle that increases the acceleration/deceleration of the host vehicle by one rank so as to allow the host vehicle to follow up the front vehicle at a more appropriate speed and supply the new duty cycle to the controller unit 364*a*. The flow of processing then continues to the step 3009 at which, receiving the newly selected duty cycle, the control unit 364*a* carries out operations to read out information identifying an operating signal corresponding to a cruise mode selected at the step 2007 of the flowchart shown in FIG. 12 from the storage unit 362 and to output the operating signal identified by the information read out from the storage unit 362 at the new duty cycle selected at the step 3007 and at the predetermined period. It should be noted that the operating signal is an acceleration signal in an acceleration mode or a deceleration signal in a deceleration mode.

If the acceleration/deceleration of the host vehicle is found not lower than the acceleration/deceleration of the front vehicle by a difference equal to or greater than the predetermined value, on the other hand at the step 3006, the flow of processing continues to a step 3008, at which a duty cycle selected in the previous processing shown in FIG. 20 is used again and supplied to the control unit 364*a* because the acceleration/deceleration of the host vehicle has a value close to the acceleration/deceleration of the front vehicle.

The flow of processing then continues to the step 3009 at which, receiving the previously selected duty cycle, the control unit 364*a* carries out operations to read out information identifying an operating signal corresponding to a cruise mode selected at the step 2007 of the flowchart shown in FIG. 12 from the storage unit 362 and to output the operating signal identified by the information read out from the storage unit 362 at the previously selected duty cycle determined at the step 3008 and at the predetermined period. It should be noted that the operating signal is an acceleration signal in an acceleration mode or a deceleration signal in a deceleration mode.

According to the present embodiment, the configuration described above can prevent an uncomfortable feeling from being provided to the driver because of repetition of accelerated and constant-speed cruises alternate with each other to follow up a front vehicle which is running at an acceleration lower than the fixed-type acceleration provided by the conventional ASCD device.

As described above, in the present embodiment, the map stored in the map sub-unit 367*b* is used to select a duty cycle only when a cruise mode selected at the step 2007 of the flowchart shown in FIG. 12 is different from a cruise mode selected in the immediately preceding processing shown in the figure. If a cruise mode selected this time is the same as a cruise mode selected in the immediately preceding processing, on the other hand, a duty cycle is determined by comparison of the acceleration/deceleration of the host vehicle with that of the front vehicle. It should be noted, however, that the map stored in the map sub-unit 367*b* can also be used to select a duty cycle even if a cruise mode selected this time is the same as a cruise mode selected previously.

In addition, the present invention has been explained by referring to the third embodiment, one of the preferred embodiments, wherein the acceleration/deceleration of the host vehicle is adjusted by changing the duty cycle of the acceleration/deceleration signal output at a predetermined period. It is worth noting, however, that the description is not to be construed in a limiting sense. That is to say, the scope of the present invention is not limited to such an embodiment. For example, the acceleration/deceleration of the host vehicle can also be adjusted by changing the period of the acceleration/deceleration signal which comprises a train of pulses with a fixed pulse duration.

As described earlier, according to a first aspect of the present invention, it is possible to provide an ICC device that can be used in conjunction with an existing ASCD device without regard to the states of implementation of the operating signals, that is, the acceleration, deceleration and cancel signals, of the ASCD device.

In addition, according to a second aspect of the present invention, it is possible to carry out automatic follow-up cruise control even in the case of a cruise on a heavy-traffic road such as a road where the brake operation is carried out frequently.

Further, according to a third aspect of the present invention, it is possible to carry out automatic follow-up cruise control by using functions of an existing ASCD device even for a speed outside a speed range set in the ASCD device.

Furthermore, according to a fourth aspect of the present invention, it is possible to prevent the driver from feeling uncomfortable because of repetition of cruises at accelerated and constant speeds alternate with each other in following up a front vehicle running at an acceleration lower than the acceleration provided by the ASCD device.

Last but not least, according to a fifth aspect of the present invention, by using functions of an existing ASCD device, it is possible to determine the type of an operation such as acceleration or deceleration required in a follow-up cruise in a short period of time.

What is claimed is:

1. An intelligent cruise control device installed in a host vehicle and used for performing follow-up cruise control to follow up a moving target located in front of said host vehicle by supplying an operating signal generated by an operating part employed therein in accordance with an operation type including acceleration and deceleration specified by a driver to an auto cruise control device which is used for carrying out auto cruise control to adjust the speed of said host vehicle by carrying out an operation indicated by said operating signal generated by said operating part so that said host vehicle is running at said adjusted speed, said intelligent cruise control device comprising:

a storage means for storing information on said operating signal generated by said operating part for each operation type including said acceleration and deceleration;

an operation determining means for determining the type of an operation required by said host vehicle to follow up said moving target located in front of said host vehicle from information on the speed of said host vehicle and information on the range between said host vehicle and said moving target;

a signal generating means for reading out the information on said operating signal for the type of an operation determined by said operation determining means from said storage means and for generating said operating signal in accordance with said information on said operating signal read out from said storage means;

a message notifying means for requesting the driver to specify each operation type including said acceleration and deceleration in a predetermined order by using said operating part;

a signal detecting means for sequentially detecting operating signals sequentially generated at said operating part for each operation type including said acceleration and deceleration specified by the driver in said predetermined order as requested by said message notifying means; and a storage control means for controlling storage, in said storage means as said operating signals are detected, of information on each of said operating signals sequentially detected by said signal detecting means as information for said specified operation type as requested by said message notifying means in said predetermined order.

2. An intelligent cruise control device adapted for a retrofit installation in a host vehicle having an existing auto cruise control device with at least one existing input for an operating signal, said intelligent cruise control device being used for performing follow-up cruise control to follow up a moving target located in front of said host vehicle by supplying the operating signal generated by an operating part employed therein in accordance with an operation type including acceleration and deceleration specified by a driver to the existing auto cruise control device which is used for carrying out auto cruise control to adjust the speed of said host vehicle by carrying out an operation indicated by said operating signal generated by said operating part so that said host vehicle is running at said adjusted speed, and being used for halting said auto cruise control in case the driver carries out a brake operation until said operating signal is generated again, said intelligent cruise control device comprising:

a brake-operation detecting means for detecting a brake operation;

a control halting means which is used for halting supplying of said operating signal in order to stop said follow-up cruise control when a brake operation is detected by said brake-operation detecting means;

a range judging means which is used for forming a judgment as to whether or not a range between said host vehicle and said moving target located in front of said host vehicle is maintained at a value set in advance in accordance with the speed of the host vehicle after a predetermined period of time has elapsed since detection of said brake operation by said brake-operation detecting means; and a follow-up-cruise-control resuming means which is used for re-starting said supplying of said operating signal to the existing auto cruise control device through the at least one existing input in order to resume said follow-up cruise control when an outcome of said judgment formed by said range judging means indicates that said range between said host vehicle and said moving target located in front of said host vehicle is maintained at said value.

3. An intelligent cruise control device installed in a host vehicle for carrying out follow-up cruise control, said intelligent cruise control device comprising:

an operating part for generating an operating signal in accordance with an operation type including acceleration and deceleration specified by the driver;

a speed-signal generating means for generating a speed signal with a frequency proportional to the speed of said host vehicle; and a speed detection means for detecting said speed by inputting said speed signal generated by said speed-signal generating means, wherein said follow-up cruise control is performed thereby to follow up a moving target located in front of said host vehicle by supplying said operating signal to an auto cruise control device which is used for carrying out auto cruise control to adjust the speed of said host vehicle within a predetermined speed range by carrying out an operation indicated by said operating signal generated by said operating part so that said host vehicle is running at an adjusted speed supplied to said speed detection means, said intelligent cruise control device further comprising a control means for controlling said auto cruise control device by modulating the frequency of said speed signal generated by said speed-signal generating means and for supplying said frequency-modulated speed signal to said speed detection means in order to shift the frequency of said speed signal generated by said speed-signal generating means to a frequency representing a speed in said predetermined speed range before said frequency modulated speed signal was supplied to said speed detecting means so as to allow said follow-up cruise control to be carried out even for an actual speed outside said predetermined speed range.

4. An intelligent cruise control device adapted for a retrofit installation in a host vehicle having an existing auto cruise control device with at least one existing input for an operating signal, said intelligent cruise control device being used for performing follow-up cruise control to follow up a moving target located in front of said host vehicle by supplying the operating signal generated by an operating part employed therein in accordance with an operation type including acceleration and deceleration specified by a driver to the existing auto cruise control device which is used for carrying out auto cruise control to adjust the speed of said host vehicle by carrying out an operation indicated by said operating signal generated by said operating part so that said host vehicle is running at said adjusted speed, said intelligent cruise control device further comprising:

an operation determining means for determining the type of an operation required by said host vehicle to follow up said moving target located in front of said host vehicle from information on the speed of said host vehicle and information on the range between said host vehicle and said moving target;

an acceleration computing means for computing the acceleration of said moving target located in front of said host vehicle from said information on the speed of said host vehicle and said information on the range between said host vehicle and said moving target; and a signal generating means for generating an operating signal corresponding to the type of the operation determined by said operation determining means, said generated operating signal being supplied to the existing auto cruise control device through the at least one existing input to make the acceleration of said host vehicle substantially equal to said acceleration of said moving target calculated by said acceleration computing means.

5. An intelligent cruise control device installed in a host vehicle and used for performing follow-up cruise control to follow up a moving target located in front of said host vehicle by supplying an operating signal generated by an operating part employed therein in accordance with an operation type including acceleration and deceleration specified by the driver to an auto cruise control device which is used for carrying out auto cruise control to adjust the speed of said host vehicle by carrying out an operation indicated by said operating signal generated by said operating part so that said host vehicle is running at said adjusted speed, said intelligent cruise control device further comprising:

a time-interval/closing-rate computing means for computing a time interval and a closing rate from information on the speed of said host vehicle and information on the range between said host vehicle and said moving target located in front of said host vehicle, where said time interval is defined as the length of time it takes for said host vehicle to arrive at the present position of said moving target located in front of said host vehicle by assuming that said moving target is stationary, and said closing rate is defined as the speed of said host vehicle relative to said moving target;

an operation determining means for determining the type of a required operation appropriate for said time interval and said closing rate computed by said time interval/closing-rate computing means by selecting the type of said operation including said acceleration or deceleration from a map showing relations among said time interval of said host vehicle with respect to said moving target located in front of said host vehicle, said closing rate of said host vehicle with respect to said moving target and the types of operation including said acceleration and deceleration; and a signal generating means for generating said operating signal corresponding to the selected type of an operation determined by said operation determining means.

* * * * *